United States Patent [19]

Doi et al.

[11] Patent Number: 4,916,632
[45] Date of Patent: Apr. 10, 1990

[54] VIBRATION CONTROL APPARATUS

[75] Inventors: Shunichi Doi, Nagoya; Eiichi Yasuda; Yasutaka Hayashi, both of Seto, all of Japan

[73] Assignee: Kabushiki Kaisha Toyota Chuo Kenkyusho, Aichi, Japan

[21] Appl. No.: 926,628

[22] Filed: Nov. 3, 1986

[30] Foreign Application Priority Data

Nov. 7, 1985 [JP] Japan .................................. 60-249704

[51] Int. Cl.⁴ ........................ B60G 11/26; B60G 17/00
[52] U.S. Cl. ............................... 364/508; 364/424.05; 280/707; 280/688
[58] Field of Search ........................ 364/424.05, 508; 280/707–709, 688; 73/665–668

[56] References Cited

U.S. PATENT DOCUMENTS

| 4,402,375 | 9/1983 | Glaze | 280/707 |
| 4,440,093 | 4/1984 | Kakehi et al. | 280/110 |
| 4,468,050 | 8/1984 | Woods et al. | 280/707 |
| 4,555,126 | 11/1985 | Ishimitsu et al. | 280/707 |
| 4,564,214 | 1/1986 | Tokunaga et al. | 280/707 |
| 4,573,705 | 3/1986 | Kanai et al. | 280/707 |
| 4,625,993 | 12/1986 | Williams et al. | 280/707 |
| 4,639,014 | 1/1987 | Tanaka et al. | 280/708 |
| 4,650,212 | 3/1987 | Yoshimura | 280/707 |
| 4,671,533 | 6/1987 | Asami et al. | 280/707 |

*Primary Examiner*—Parshotam S. Lall
*Assistant Examiner*—V. N. Trans
*Attorney, Agent, or Firm*—Roberts, Spiecens & Cohen

[57] ABSTRACT

A vibration control apparatus detects a physical value influencing characteristics of a suspension supporting a vibrating body and a state value representing movement of the suspension, calculates an optimal target control force in consideration of an external force or disturbance acting on the suspension on the basis of the physical and state values as outputs from a state detecting system, calculates the detection control force corresponding to the detected physical value, and continuously variably controls the suspension characteristics so as to generate a control force corresponding to the difference between the target and detection control forces in consideration of the external force or disturbance acting on the suspension, whereby vibrations are prevented by equivalently applying the target control force on the suspension.

14 Claims, 19 Drawing Sheets

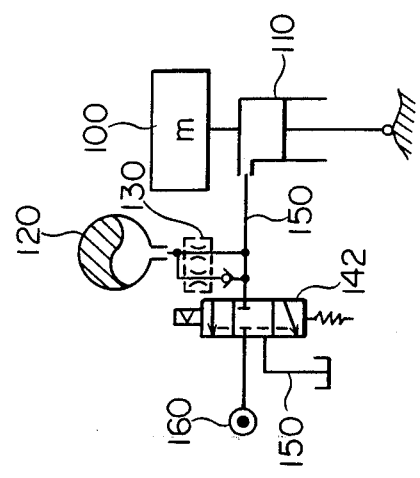
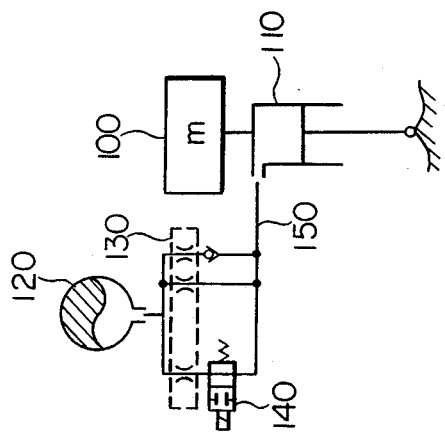
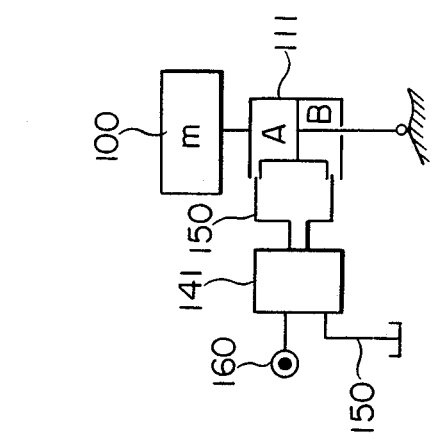
FIG. 2A PRIOR ART
FIG. 2B PRIOR ART
FIG. 2C PRIOR ART

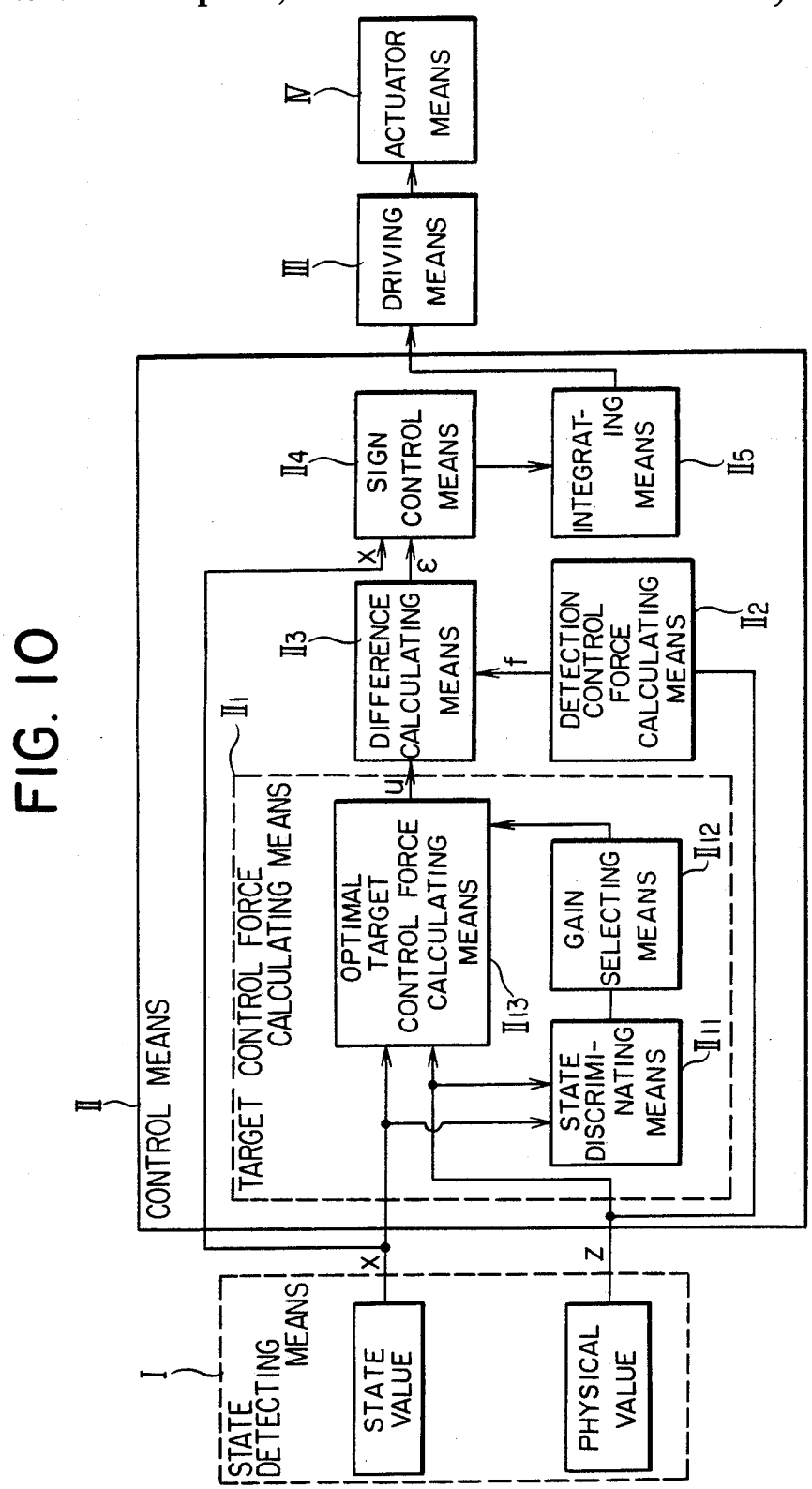

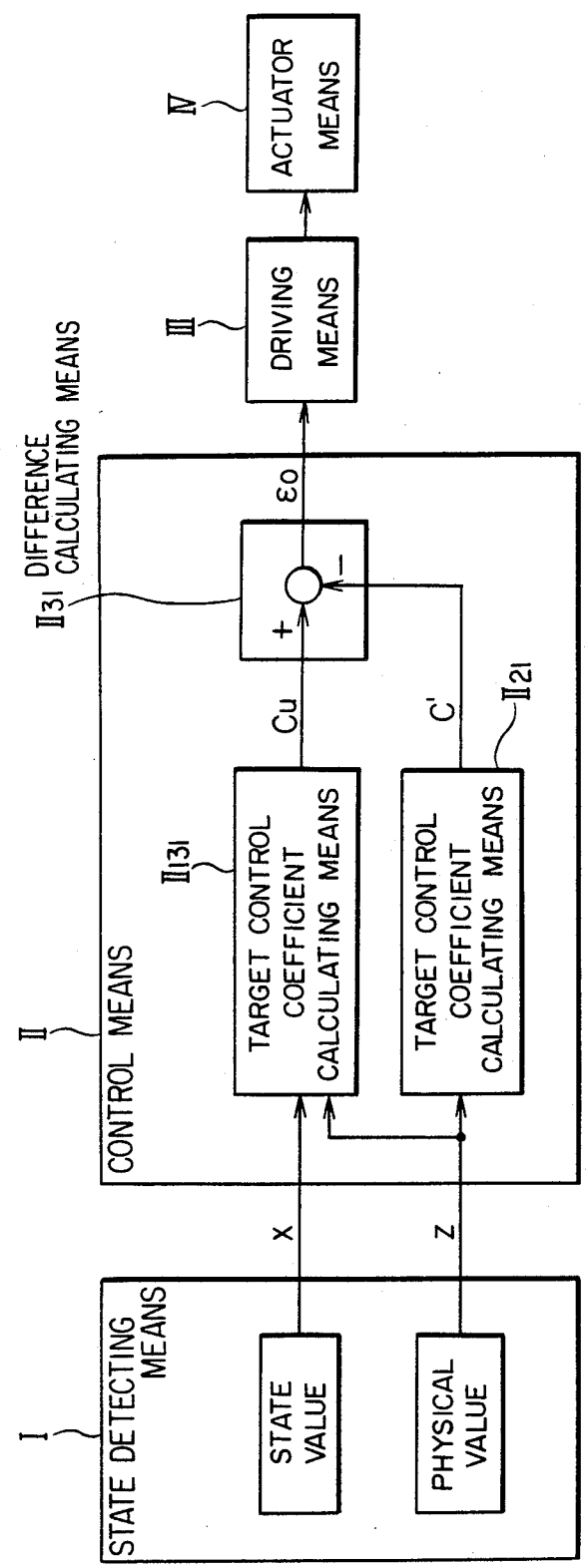

VIBRATION CONTROL APPARATUS

DESCRIPTION OF THE PRIOR ARTS 1. (Field of the Invention)

The present invention relates to a vibration control apparatus in a support for a building or a moving vehicle when the building or the moving vehicle is vibrated by an external force or disturbance (a road surface).

2. (Related Prior Art)

Conventional vibration cotnrol apparatuses are controlled by three techniques: (1) active control; (2) semiactive control; and (3) partial active control.

Active control aims at controlling vibrations by forcibly applying large energy outside a suspension to the external force or disturbance. For example, as shown in FIG. 2(a), in a conventional vibration control apparatus comprising: a hydraulic cylinder 111 having hydraulic chambers A and B at both sides of a piston surface so as to support a vibrating body 100 with a mass m; an electric/hydraulic servo valve 141; a hydraulic source 160; and a hydraulic path or piping 150 for allowing communication between the hydraulic cylinder 111, the electric/hydraulic servo valve 141, and the hydraulic source 160, the electric/hydraulic servo valve 141 is driven in response to an instruction signal. The pressure of the hydraulic source 160 is controlled to supply oil to the hydraulic chambers A and B in the hydraulic cylinder 111. Therefore, the force acting on the hydraulic cylinder 111 is constantly controlled.

Semiactive control aims at changing the damping force characteristics by small energy expenditure to control the vibration restriction effect, as opposed to a conventional damper exhibiting a vibration control effect for the external force or disturbance acting on the suspension according to constant viscous damping force characteristics. As shown in FIG. 2(b), in a conventional vibration control apparatus comprising: an orifice 130 formed along a hydraulic path or piping 150 for allowing communication between a hydraulic cylinder 110 and a hydropneumatic spring 120; and a single electromagnetic selector (including a motor-controlled selector) 140 for the orifice, the electromagnetic selector 140 is turned on/off in response to an instruction signal to obtain two different sizes of the orifice opening. In other words, two different damping characteristics are controlled by small electric energy expenditure.

In this case, the number of damping characteristics is two, but may be three.

Partial active control aims at controlling vibrations of the sprung mass by expending partial energy outside the suspension according to the magnitude of the external force or disturbance. As shown in FIG. 2(c), in a conventional vibration control apparatus comprising: a hydraulic cylinder 110; a hydropneumatic spring 120; a fixed orifice 130 formed midway along a hydraulic path or piping 150 for allowing communication between the hydraulic cylinder 110 and the hydropneumatic spring 120; an electromagnetic selector 142 for supplying compressed oil to or exhausting it from the hydraulic cylinder 110; and a hydraulic source 160, the electromagnetic selector 142 is turned on/off in response to an instruction signal. The compressed oil is supplied from the hydraulic source 160 to the hydraulic chamber in the hydraulic cylinder 110 or exhausting it from the hydraulic chamber in the hydraulic cylinder 110 to the hydraulic source 160. Therefore, the damping force is controlled by a displacement of the hydraulic cylinder.

(PROBLEMS OF THE PRIOR ART)

In the conventional vibration control apparatus by active control, the force acting on the suspension must be always controlled by using the pressure of the hydraulic source, and energy consumed by the hydraulic source is large. In addition, the number of components such as a pump, a tank, and a pressure accumulator, all of which constitute the hydraulic source, is increased which results in a bulky, high-cost apparatus.

In the conventional vibration control apparatus by semiactive control, as shown in FIG. 3, a state must be discriminated by a state discriminating means IIa on the basis of an output from a state detecting means I. Proper characteristics are selected by a control means II on the basis of the output from the state discriminating means IIa. For this reason, in order to control the vibrations, two or three damping force characteristic curves must be selected in response to the instruction signal upon ON/OFF operation of the electromagnetic selector 140. Since semiactive control is a discrete control scheme, optimal damping force characteristics cannot be obtained so as to generate an optimal target control force in consideration of various external forces or disturbance although vibrations can be reduced. Therefore, the vibrations cannot be sufficiently prevented.

In the conventional vibration control apparatus by partial active control, the compressed oil is supplied to or exhausted from the hydraulic chamber in the hydraulic cylinder 110 upon ON/OFF operation of the electromagnetic selector 142. In this manner, part of the target control force is externally supplied to result in incomplete vibration control. In addition, since partial active control is a discrete control scheme, the ON/OFF operation of the electromagnetic selector cannot satisfy fine control for vibrations having a high frequency although partial active control is effective for vibrations of sprung mass with a frequency of about 1 Hz.

In fine control, the apparatuses using semiactive control and partial active control do not control all the vibration control force but discretely control the object to be controlled. Perfect control cannot thus be performed. In the apparatus using active control, the required control force can be directly controlled. However, a large power is always required and the apparatus becomes bulky, resulting in inconvenience.

SUMMARY OF THE INVENTION

Object of the Invention

In order to solve the conventional problems described above, an object of the present invention is to provide a vibration control apparatus capable of:

(1) continuously controlling suspension characteristics required for vibration control so as to equivalently obtain an optimal target control force corresponding to an input state with high sensitivity for an external force or disturbance; and (2) reducing the weight, space, cost of a power source and piping with a simple construction and at the same time maximizing the capacity.

The present inventors solved the conventional major problems in the following manner. Unlike in conventional techniques, a difference between an optimal target control force to be acted on a suspension and an actual detected suspension control force was calculated, and suspension characteristics were continuously controlled by the difference. The target control force required for vibration control was equivalently applied to the suspension. On the basis of semiactive control for reducing power consumption, an essential function of active control for continuously controlling the external control force acting on the suspension was employed to combine the advantages of semiactive control and active control.

SUMMARY OF THE INVENTION

As shown in FIG. 1, a vibration control apparatus of the present invention comprises: state detecting means I for detecting a physical value influencing the characteristics of a suspension supporting a vibrating body and for detecting a state value representing movement of the suspension; control means II including target control force calculating means $II_1$, detection control force calculating means $II_2$, and difference calculating means $II_3$, the target control force calculating means $II_1$ being adapted to calculate an optimal target control force in consideration of an external force or disturbance acting on the suspension on the basis of the physical and state values as outputs from the state detecting means, the detection control force calculating means $II_2$ being adapted to calculate a detection control force corresponding to the physical value detected by the state detecting means I, the difference calculating means $II_3$ being adapted to calculate the difference between the target control force and the detection control force; driving means III for amplifying the difference signal representing the difference between the target and detection control forces from the control means II; and actuator means IV for variably continuously controlling the suspension characteristics so as to equivalently generate a control force corresponding to the difference between the target and detection control forces in consideration of the external force or disturbance acting on the suspension, on the basis of an amplified output from the driving means III, wherein the suspension characteristics can be continuously variably controlled so as to generate the control force corresponding to the difference between the target control forces in consideration of the external force or disturbance acting on the suspension, thereby preventing vibrations by equivalently applying the target control force on the suspension.

The operation and effect of the arrangement according to the present invention are as follows.

A time-serial optimal target control force u in consideration of vibrations of a vibrating body m caused by an external force or disturbance acting on a suspension for supporting the vibrating body is given by the following equation for FIG. 2(a) if active control is assumed:

$$m\ddot{x} = u(x, \dot{x}, \ddot{x}) \quad (1)$$

where x is the suspension displacement by the external force or disturbance, $\dot{x}$ is the suspension speed, and $\ddot{x}$ is the acceleration. In other words, the target control force u is a function of x, $\dot{x}$ and $\ddot{x}$.

The target control force u can be generally rewritten as follows:

$$u = \sum_{i=1}^{n} g_i x_i$$

where $g_i$ is the gain coefficient for the optimal vibration control, and $x_i$ is the total state value of the entire vibration system. The suspension displacement, the speed, and the acceleration as well as a transmission force between the components of the suspension are generally included in the total state value. The optimal target control force u constitutes an instantaneous state feedback control system by instantaneously detecting the state physical value $x_i$ of the vibrating body m and giving the coefficient $g_i$ on the basis of the magnitude of the state physical value $x_i$. Therefore, optimal vibration control for the mass vibration system can be achieved.

A physical value f acting on the suspension upon an application of the target control force u is detected by a sensor. The physical value f is negatively fed back, and an output representing a difference $\epsilon(=u-f)$ is amplified by the driving means III. The actuator means IV mounted on the suspension is driven by the amplified output, and thus the physical value f is continuously controlled. More specifically, a force component of the physical value f is extracted from the optimal target control force $u(x,\dot{x},\ddot{x})$ and controlled to finely adjust the physical value f in consideration of the external force or disturbance as compared with the conventional vibration control apparatuses. At the same time, energy consumption can be reduced, the construction can be simplified, and the weight, space, and cost of the power source and piping can be reduced.

(DESCRIPTION OF ASPECTS OF THE INVENTION)

First Aspect

FIG. 4 is a block diagram showing a first aspect of the present invention. A control means II comprises a sign control means $II_4$ for multiplying a difference signal from the difference calculating means $II_3$ with a signal of the state value representing the movement of the suspension and detected by the state detecting means I and for discriminating whether equivalent control of the target control force which traces the movement of the suspension can be achieved. A control signal for controlling the suspension characteristics is output on the basis of an output from the sign control means $II_4$.

The operation and effect of the first aspect with the above arrangement will be described below.

In the control means II, the target control force calculating means $II_1$ calculates the optimal control force u for the movement x of the suspension, and a first detecting means in the state detecting means I detects the physical value f representing the control force acting on the suspension through activator means IV. The detection control force calculating means $II_2$ calculates a signal representative of the detection control force f and this signal is negatively fed back. The difference $\epsilon(=u-f)$ output from the difference calculating means $II_3$ is multiplied by the signal control means $II_4$ by the suspension movement x detected by a sensor of the first detecting means. If the output $\epsilon x$ is positive, i.e., the difference $\epsilon$ and the movement x have the same signs, the driving means III amplifies the difference signal $\epsilon$ to drive the actuator means IV mounted on the suspension there to control the suspension characteristics. As a result continuous control of the value of physical force f is obtained. Therefore, the control force is applied to reduce the control force currently acting on the suspension so as to obtain the target control force. However, if the output εx is negative, i.e., the difference ε and the movement x have opposite signs, control is performed to reduce the physical value f as opposed to the above operation. It should be noted that even if the difference ε and the movement x of the suspension have opposite signs, control operation is inhibited if the direction of the target control force is opposite to that of the movement x of the suspension.

The suspension characteristics, i.e., the physical value acting on the suspension, are additionally controlled in accordance with a value corresponding to the difference between the target control force and the detection control force representing the physical value acting on the suspension. At the same time, the sign control means II$_4$ controls the directions of the difference and the movement x of the suspension. Unlike the conventional vibration control apparatus wherein the characteristic value is simply switched according to a change in state, thereby partially controlling the vibrations, the suspension can be controlled according to an optimal control force required for vibration control in consideration of the external force or disturbance according to the first aspect of the present invention. The physical value f can be finely adjusted, and sufficient vibration prevention can be achieved. At the same time, energy consumption can be minimized, the construction can be simplified, and the weight, space, cost of the power source and piping can be reduced.

Second Aspect

FIG. 5 is a block diagram showing a second aspect of the present invention. In addition to the first aspect of the present invention, an integrating means II$_5$ is further included in the control means II. The integrating means II$_5$ integrates the output signal from the sign control means II$_4$ as a function of time to eliminate an offset (a residual difference) of the control force. The suspension characteristics are controlled in proportion to the magnitude of an output from the integrating means II$_5$. The offset (residual difference) causing an error in target force control in consideration of the external force or disturbance acting on the suspension can be removed. At the same time, an integrated output is used to control the actuator, thereby reducing the control frequency with a large magnitude.

Third Aspect

FIG. 6 is a block diagram showing a third aspect of the present invention. According to the third aspect, the state detecting means I in the second aspect comprises a first sensor for detecting a damping force of the suspension and a second sensor for detecting a speed of members constituting the suspension, the speed being defined as the movement of the suspension. In addition, the actuator means IV in the second embodiment includes a means for continuously variably changing a damping coefficient as the suspension characteristics.

The operation and effect of the third aspect having the structural features described above will be described below.

In the state detecting means I, the first sensor mounted on the suspension detects a damping force fc acting on the suspension, and the second sensor detects a suspension speed $\dot{x}$. The control means II subtracts the detection control force fc corresponding to the damping force currently acting on the suspension from the time-serial optimal target control force u(x,$\dot{x}$,$\ddot{x}$) corresponding to the external force additionally acting on the suspension in active control to calculate a difference ε(=u−fc). The difference ε is multiplied with the suspension speed $\dot{x}$, and a product ε$\dot{x}$ is integrated as a function of time. If the multiplication output ε$\dot{x}$ is positive, the integrated output is also positive. The output is amplified by the driving means III to drive the actuator means IV mounted on the suspension, thereby continuously increasing a damping coefficient C according to the output ε$\dot{x}$ and hence continuously increasing the damping force fc.

However, if the output ε$\dot{x}$ is negative, the damping coefficient C is continuously reduced to continuously decrease the damping force fc.

An optimal control force u(x) associated with the damping force is calculated from the optimal target control force u(x,$\dot{x}$,$\ddot{x}$), and control is performed to cause the equivalent force fc required for vibration control to act on the suspension.

In the case of the negative output ε$\dot{x}$, even if the signs of the difference ε and the suspension speed $\dot{x}$ are opposite, control operation is inhibited under the condition that the directions of the target control force and the suspension movement are opposite.

This is expressed by a motion equation of a vibration model with one variable:

$$m\ddot{x} = k_0 x + c\dot{x} + u \qquad (3)$$

$$C = u/\dot{x} + c \qquad (4)$$

where $k_0$ is a given spring constant.

As compared with the conventional vibration control apparatus, control is performed such that the suspension damping force fc can be detected and the suspension damping coefficient is controlled to cause the target control force to equivalently act on the suspension. A phase delay and overshooting can be reduced with respect to the optimal target control force u, and an increase in vibration accompanying the phase delay and overshooting can be prevented. The damping effect can be greatly reduced, and the damping force can be continuously changed. Therefore, the application range of the damping effect can be widened.

Fourth Aspect

FIG. 7 is a block diagram showing a fourth aspect of the present invention. A state detecting means I comprises a third sensor for detecting a spring force $f_k$ of the suspension which serves as the physical value f, and a fourth sensor for detecting suspension member displacement as the motion of the suspension. The actuator means IV comprises means for continuously and variably changing the spring constant as the suspension characteristics.

The operation and effect of the fourth aspect having the structural features described above will be described below.

In the state detecting means I, the third sensor mounted on the suspension detects the spring force $f_k$ acting on the suspension, and the fourth sensor detects a suspension displacement x. The control means II subtracts the spring force $f_k$ currently acting on the suspension from the time-serial 10 optimal target control force u(x,$\dot{x}$,$\ddot{x}$) under the consumption of active control. A difference ε(=u−$f_k$) is multiplied with the suspension displacement x. An output εx from the control means II is integrated as a function of time. If the multiplication output εx is positive, the integrated output is also positive. The output from the integrating means is amplified by the driving means III to drive the actuator means IV mounted on the suspension. The spring constant k is continuously increased according to the multiplication output $\epsilon x$ until the spring force $f_k$ reaches the target control force.

However, if the output $\epsilon x$ is negative, unlike in the above case, the spring constant $k_2$ and hence the spring force $f_k$ are continuously reduced. More specifically, the optimal control force u(x) concerning the spring force is calculated from the optimal target control force $u(x,\dot{x},\ddot{x})$ so as to cause the equivalent spring force $f_k$ required for vibration damping to act on the suspension.

Even if the signs of the difference $\epsilon$ and the suspension displacement x are opposite in the case of the negative output $\epsilon x$, control operation is inhibited under the condition that the directions of the target control force and the suspension movement are opposite.

This is expressed by a motion equation of a vibration model with one variable:

$$m\ddot{x} = kx + C_0\dot{x} + u \qquad (5)$$

$$K = u/x + k \qquad (6)$$

where $C_0$ is a given damping coefficient.

As compared with the conventional vibration control apparatus, vibration control with high energy efficiency can be achieved since the spring force $f_k$ of the suspension is detected and the spring constant k of the suspension is continuously changed, thereby controlling the storage/discharge of vibration energy as the feature of the spring force.

Fifth Aspect

FIG. 8 is a block diagram showing a fifth aspect of the present invention. The state detecting means I comprises the first and third sensors for respectively detecting a suspension damping force fc and a spring force $f_k$ as the physical values, and the second and fourth sensors for respectively detecting the suspension member displacement $\dot{x}$ and displacement x as movement of the suspension. The control means II multiplies the suspension speed $\dot{x}$ detected by the second sensor and the suspension displacement x detected by the fourth sensor with a difference $\epsilon = u - (fc + f_k)$ between the optimal target control force u and a sum $(fc + fk)$ of the suspension damping force fc and the spring force $f_k$, which are respectively detected by the first and third sensors. The products are then integrated as a function of time to generate the first output for controlling the damping force and the second output for controlling the spring force. The driving means III comprises means for respectively amplifying the first and second outputs. The actuator means IV comprises a first actuator means for continuously and variably controlling the damping coefficient on the basis of the signal obtained by amplifying the first output and a second actuator means for continuously and variably controlling the spring coefficient on the basis of a signal obtained by amplifying the second output.

The operation and effect of the fifth aspect having the structural features will be described below.

According to the fifth aspect, the suspension damping force fc and the spring force $f_k$ respectively detected by the first and third sensors are negatively fed back to the time-serial optimal target control force $u(x,\dot{x},\ddot{x})$ based on active control. The damping force fc and the spring force $f_k$ are simultaneously and equivalently controlled based on the difference. The effect is a combination of the third and fourth aspects.

The optimal control forces $u(\dot{x})$ and $u(x)$ for the damping and spring forces are calculated from the optimal target control force $u(x,\dot{x},\ddot{x})$, and control is performed to cause an equivalent control force required for vibration damping to act on the suspension. This is expressed by a motion equation of a vibration model with one variable:

$$m\ddot{x} = kx + c\dot{x} + u \qquad (7)$$

As compared with the conventional vibration control apparatus, the optimal target control force $u(x,\dot{x},\ddot{x})$ is compensated by the damping and spring forces fc and $f_k$ which are 90° phase apart from each other. If control cannot be performed with the damping force fc, the spring force is used. If control cannot be performed with the spring force, then the damping force is used. Therefore, control with high precision can be always achieved.

Sixth Aspect

FIG. 9 is a block diagram showing a six aspect of the present invention. In addition to the fifth aspect, the control means II in the sixth aspect includes a means for generating a third suspension force in proportion to difference between the target control force and the sum of the spring and damping forces, if needed, upon detection of the polarity (i.e., the sign) or magnitude of the difference. The driving means III comprises a means for amplifying the third output. According to the sixth aspect, there is further provided a third actuator means for continuously and variably controlling a control force externally acting on the vibrating body independently of the suspension movement, on the basis of a signal obtained by amplifying the third output.

The operation and effect of the sixth aspect having the above structural features will be described below.

The time region of the optimal target control force $u(x,\dot{x},\ddot{x})$ based on active control and not controlled by the damping force fc and the spring force $f_k$ in the fifth aspect is discriminated by the polarity or magnitude of the difference in the sixth aspect. The third output proportional to the difference is switched. If the control means II generates the third output, it is amplified by the driving means III to drive the third actuator means directly supporting the vibrating body. In other words, the time region when the damping force fc and the spring force $f_k$ cannot respond to the optimal target control force is compensated by the third actuator means. This is expressed by a motion equation of a vibration model with one variable:

$$\begin{aligned} m\ddot{x} &= kx + c\dot{x} + u' \\ &= u(x,\dot{x},\ddot{x}) \\ \text{for } u' &= u(\ddot{x}) \end{aligned} \qquad (8)$$

The vibration control apparatus of this aspect can obtain the same damping effect as that of active control. At the same time, as compared with the conventional active control apparatus, the power source (a hydraulic source) can be considerably reduced, and the energy consumption, the weight and the space can also be reduced.

Seventh Aspect

FIG. 10 is a block diagram showing a seventh aspect of the present invention. The target control force calculating means $II_1$ in the control means II comprises a state discriminating means $II_{11}$ for discriminating a vibrating body mass, a spring constant, a damping coefficient and an external force or disturbance state, a gain selecting means $II_{12}$ for selecting one of the prestored gains as an optimal gain for various state signals used for vibration control, on the basis of outputs from the state discriminating means $II_{11}$, and an optimal target control force calculating means $II_{13}$ for multiplying the selected gain with the state signals used for vibration control and for adding the products. The target control force can be properly set in correspondence with changes in the suspension state and the external force or disturbance state.

According to the seventh aspect, the state detecting means I causes various sensors to detect the states of the vibrating body and members around the suspension. The state discriminating means $II_{11}$ uses these state signals to instantaneously discriminate, e.g., the vibrating body mass, the spring constant, the damping coefficient, and the external force or disturbance state. The optimal gain for the various state signals for vibration control is instantaneously selected from the gains stored in the gain selecting means $II_{12}$, on the basis of the discrimination output.

The optimal target control force calculating means $II_{13}$ multiplies the selected optimal gain with the various state signals used for vibration control and adds the products to obtain an optimal target control force signal. By using this signal, the vibration control apparatus is controlled. More specifically, the vibration control apparatus negatively feeds back various state signals and spontaneously changes the state weighting coefficients (optimal gain) to automatically calculate the optimal target control force, thereby performing vibration control so as to compensate for the influence of the external force or disturbance and hence effectively maximizing the effect of the present invention.

Eighth Aspect

FIG. 11 is a block diagram showing an eighth aspect of the present invention. In addition to the seventh aspect, the control means II in the eighth aspect comprises: a target control coefficient calculating means $II_{131}$ for using the physical and state values as outputs from the state detecting means I to calculate optimal target control force coefficients contributing to the respective physical and state values constituting the optimal target control force considered with the external force or disturbance acting on the suspension; a difference calculating means $II_{21}$ for calculating detection control coefficients for actually controlling the suspension on the basis of the detection signals from the state detecting means I; and a difference calculating means $II_{31}$ for calculating the differences between the target control coefficients and the detection control coefficients.

The operation and effect of the eighth aspect having the above structural features will be described below.

In the control means II, the target control coefficient calculating means $II_{131}$ calculates the optimal target control coefficient Cu for the suspension motion x instead of calculating the target control force. The sensor detects the physical value actually acting on the suspension with respect to the optimal target control coefficient Cu. The detection control coefficient C for the suspension motion x corresponding to the physical value is negatively fed back, and the suspension characteristics are controlled in response to the difference $\epsilon_0$ ($=Cu-C'$). More specifically, the physical value, i.e., the control coefficient acting on the suspension is increased to perform control so as to obtain the optimal control coefficient Cu. In other words, the suspension characteristics, i.e., the physical value acting on the suspension, are additionally controlled in accordance with the value corresponding to the difference between the target control coefficient corresponding to the optimal target control force and the control coefficient detected and representing the physical value acting on the suspension. Therefore, although the conventional vibration control apparatus simply changes the characteristics according to the change in state, the suspension can be controlled with the optimal control force required for vibration damping in consideration of the external force or disturbance according to the eighth aspect. As a result, the physical value f can be finely adjusted, the maximum vibration damping effect can be obtained, and energy consumption can be reduced.

The above and other objects, features, and advantages of the present invention will be apparent from the following detailed description with reference to preferred embodiments in conjunction with the accompanying drawings.

BRIEF DESCRIPTION OF THE DRAWINGS

FIGS. 2(a), 2(b), and 2(c) are respectively schematic diagrams showing conventional vibration control apparatuses;

FIG. 10 is a block diagram showing a seventh aspect of the present invention;

FIG. 11 is a block diagram showing an eighth aspect of the present invention;

DETAILED DESCRIPTION OF THE PREFERRED EMBODIMENTS

First Embodiment

Figure 12A:
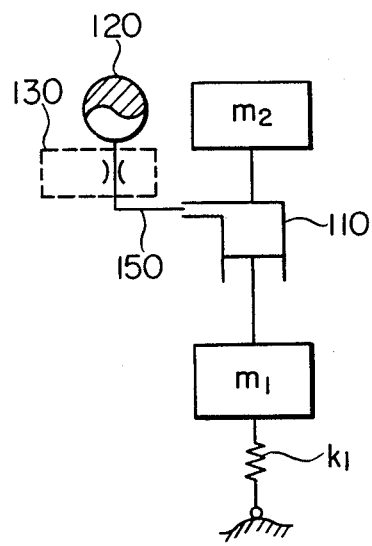
FIG. 12(a) is a schematic diagram showing an automobile hydropneumatic suspension according to a first embodiment of the present invention.

A vibration control apparatus in a first embodiment is obtained by applying the third aspect of the present invention to an automobile hydropneumatic suspension apparatus having an orifice 130 midway along a hydraulic path or piping 150 for allowing communication between a hydraulic cylinder 110 and a hydropneumatic spring 120, as shown in FIG. 12(a). The typical vehicle wheel suspension will be described with reference to FIGS. 12, 13, 14, 15, and 16.

Figure 1:
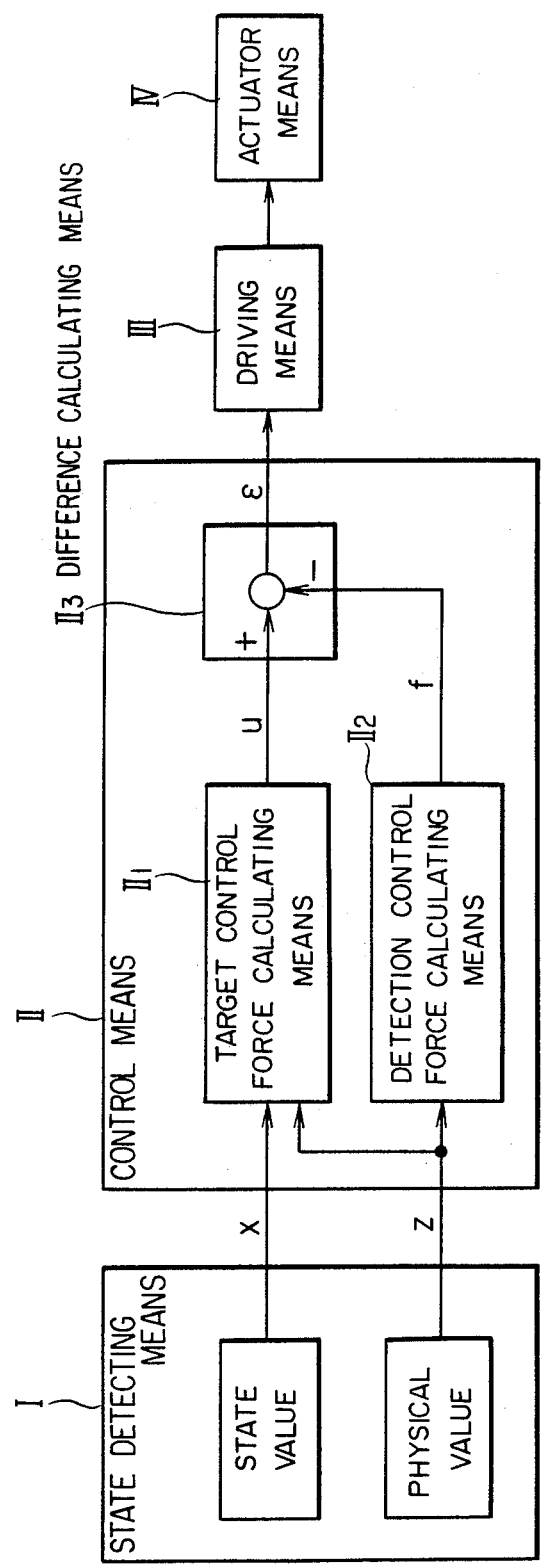
FIG. 1 is a block diagram showing the principle of the present invention.
Figure 3:
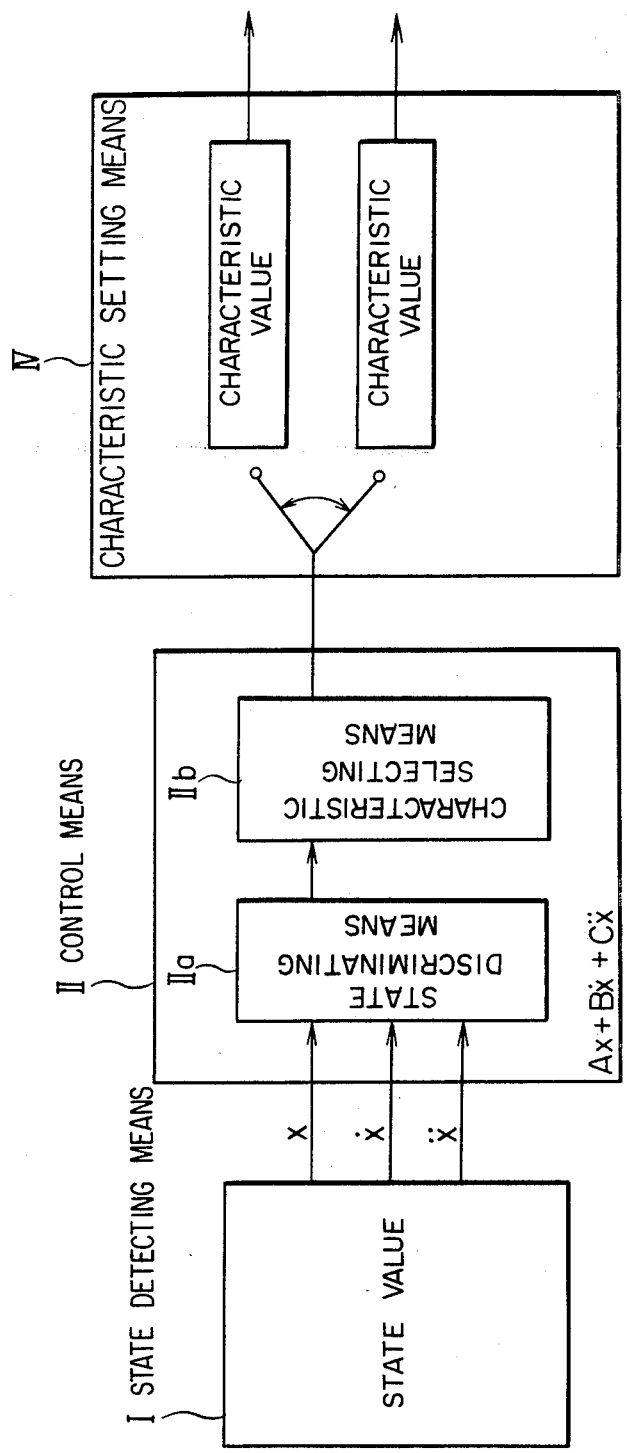
FIG. 3 is a schematic diagram showing a conventional vibration control apparatus.
Figure 4:
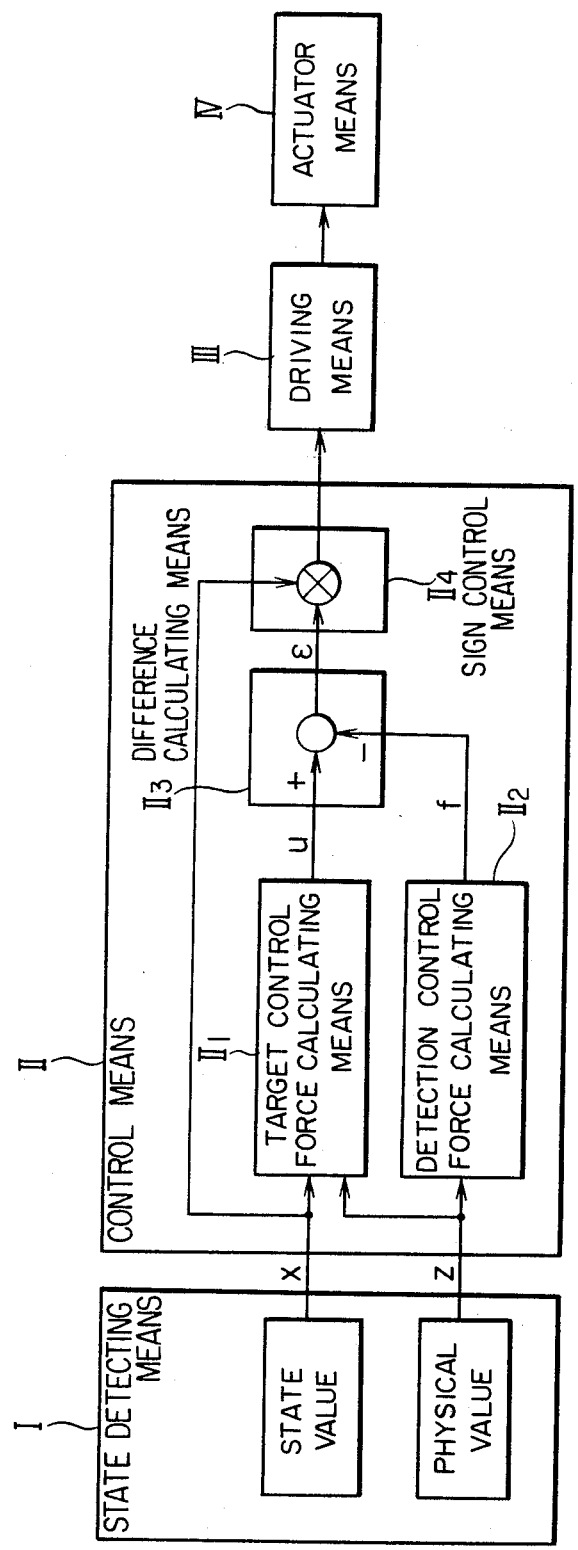
FIG. 4 is a block diagram showing a first aspect of the present invention.
Figure 5:
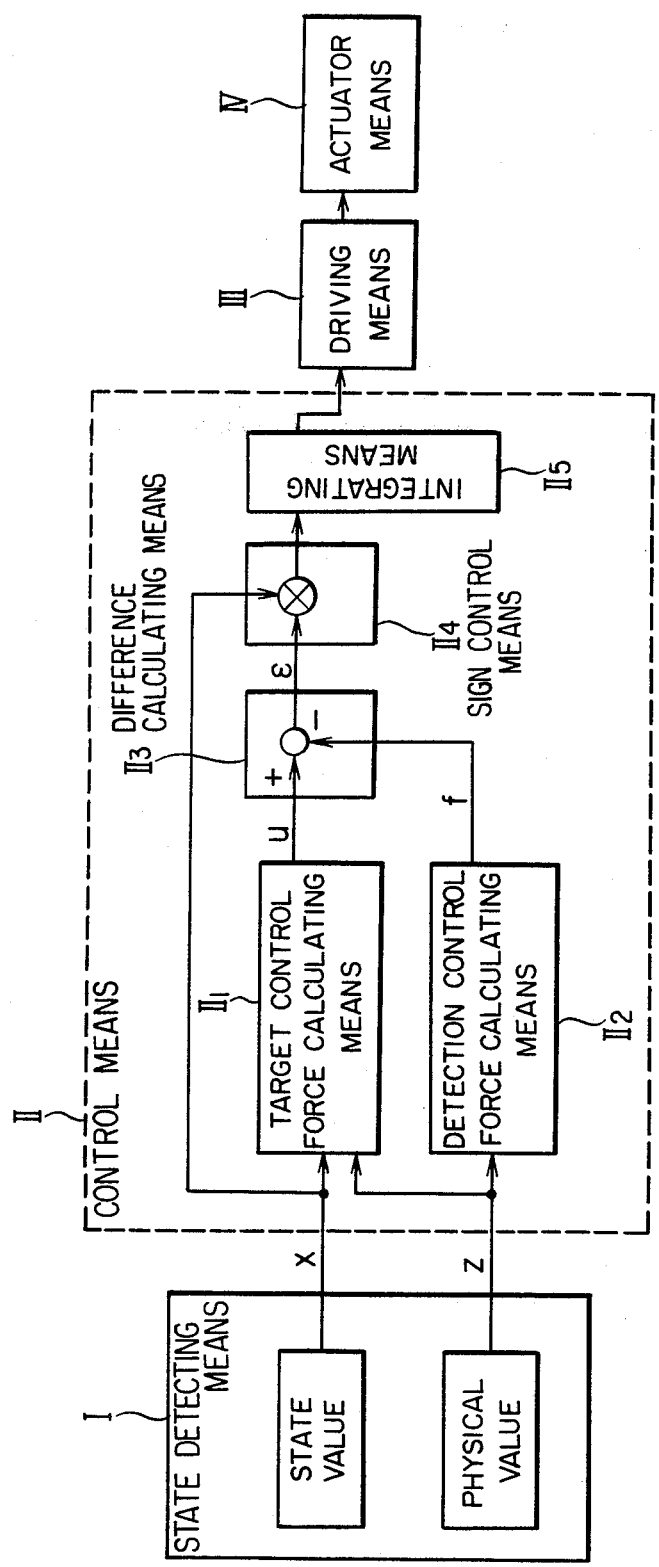
FIG. 5 is a block diagram showing a second aspect of the present invention.
Figure 6:
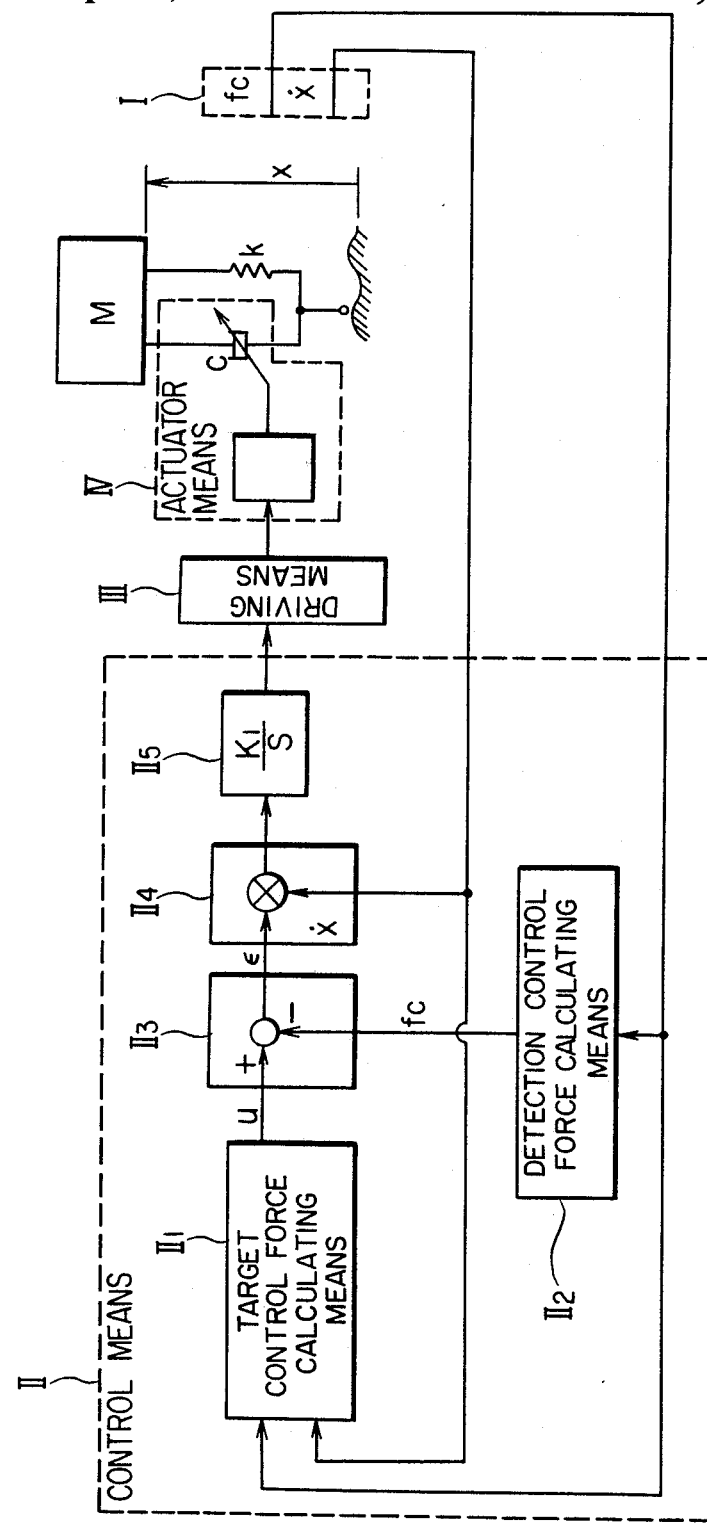
FIG. 6 is a block diagram showing a third aspect of the present invention.
Figure 7:
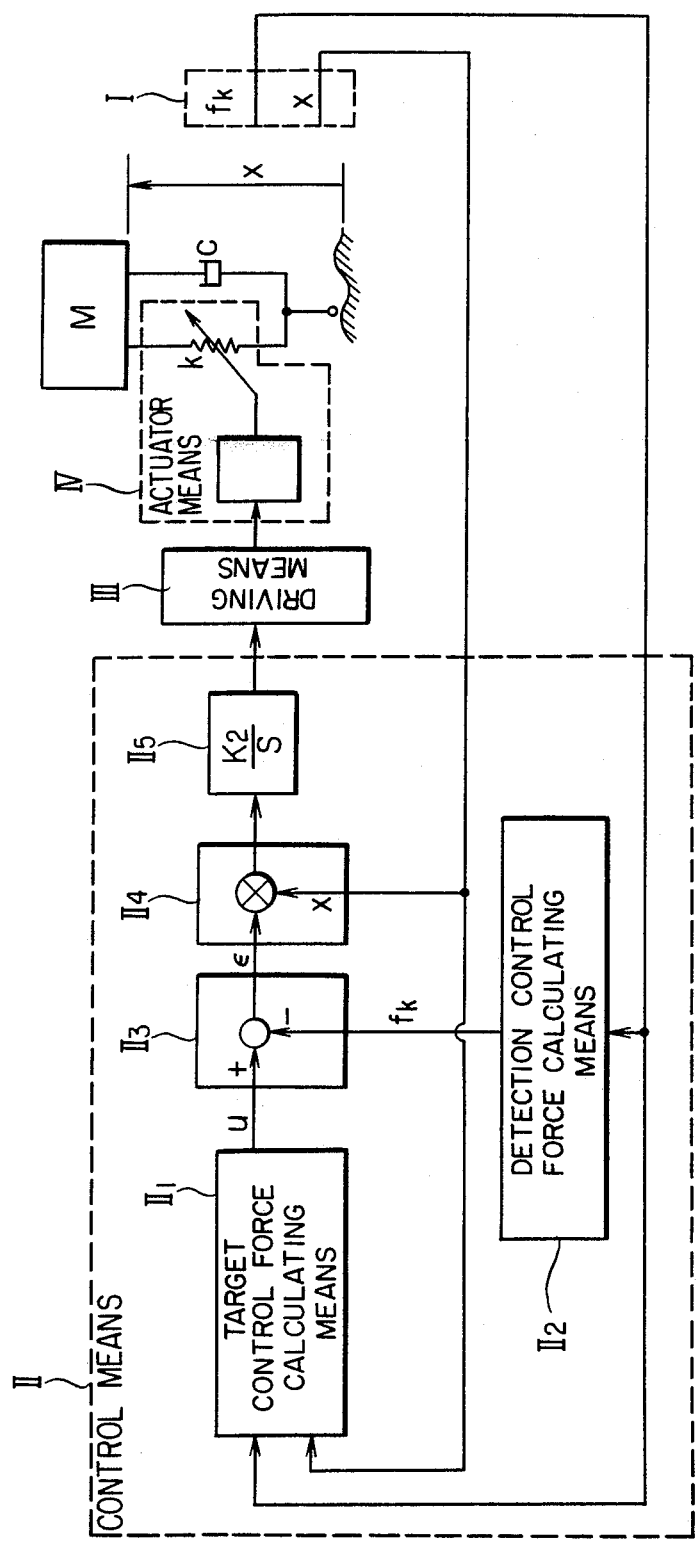
FIG. 7 is a block diagram showing a fourth aspect of the present invention.
Figure 8:
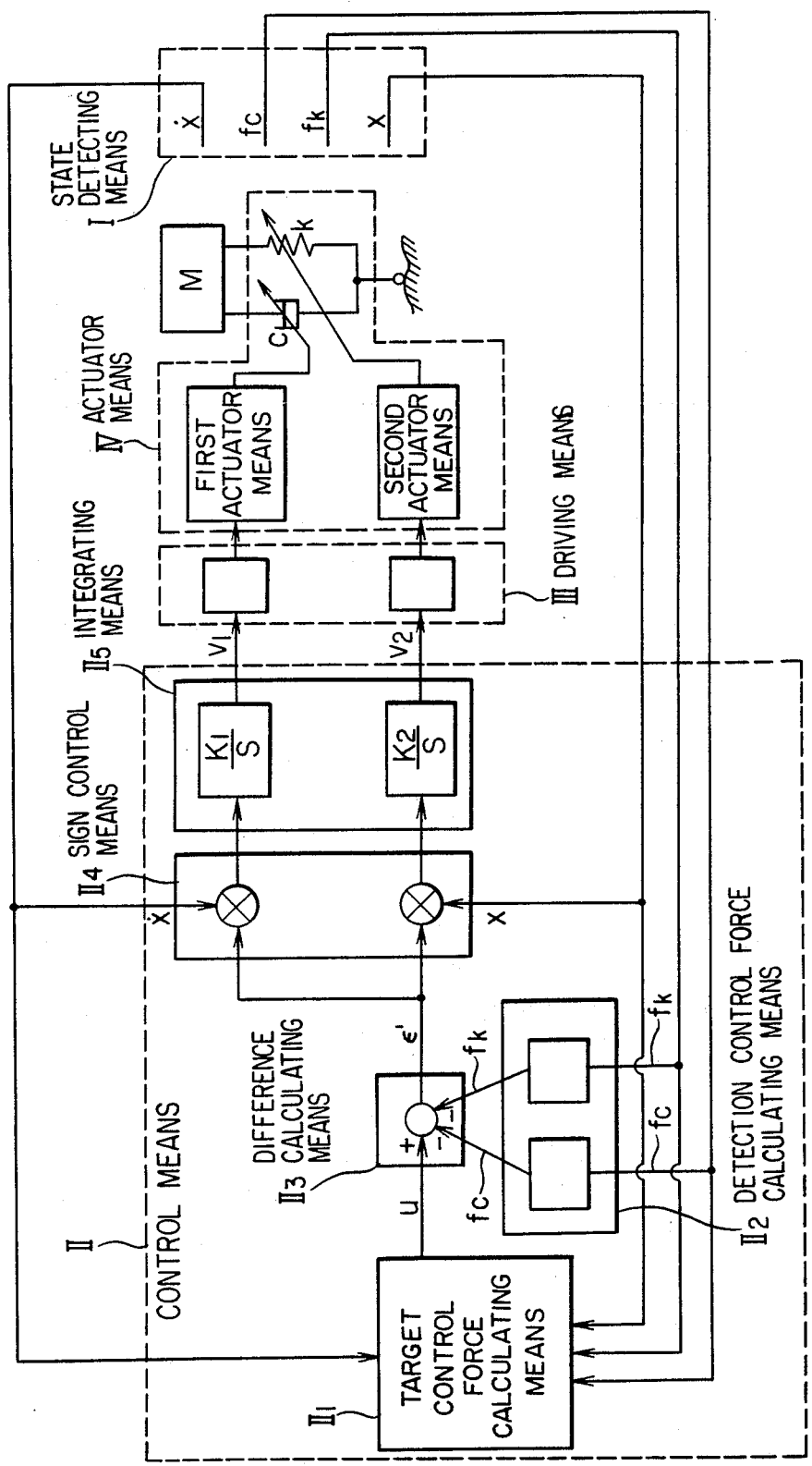
FIG. 8 is a block diagram showing a fifth aspect of the present invention.
Figure 9:
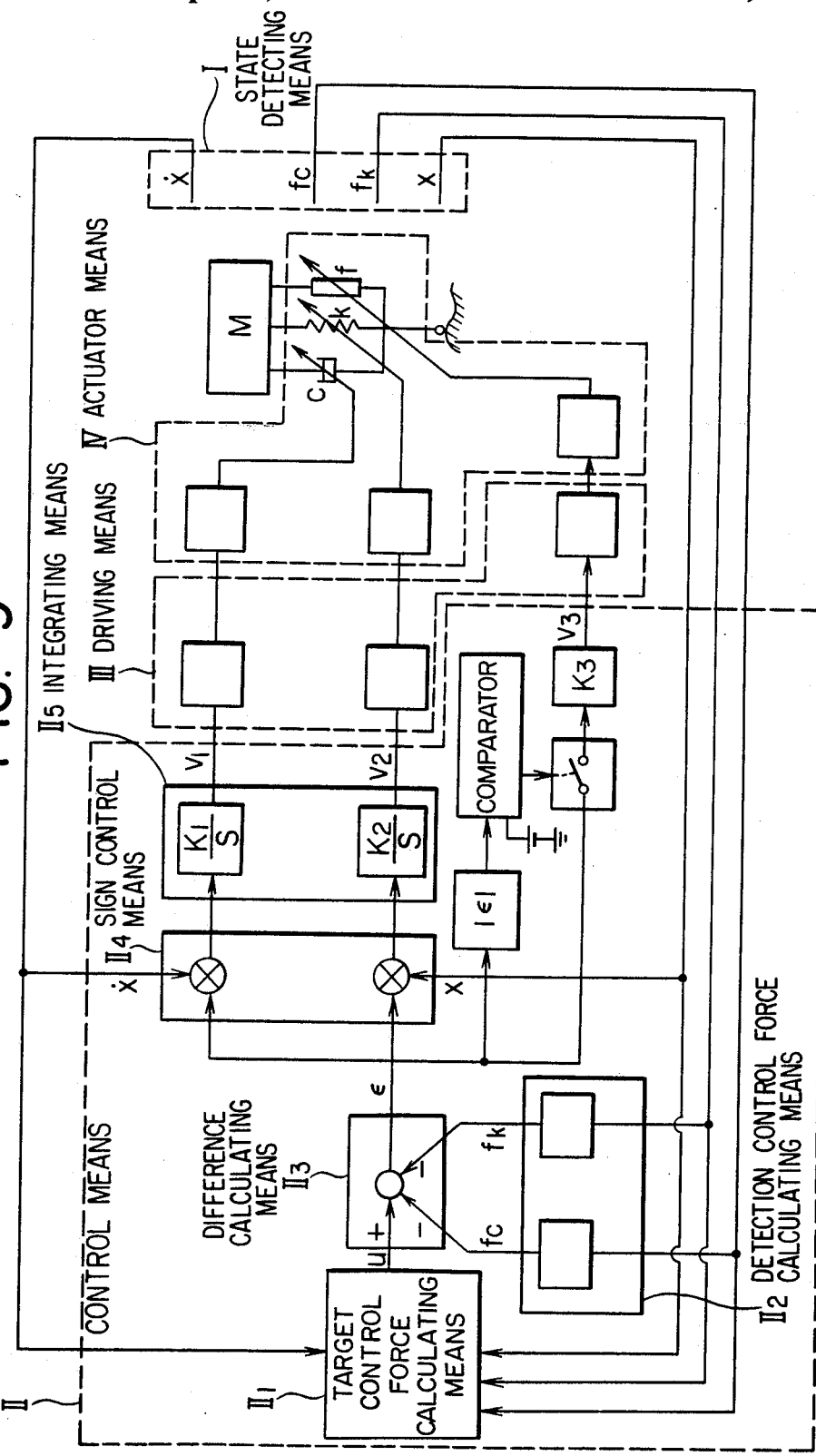
FIG. 9 is a block diagram showing a sixth aspect of the present invention.

The vibration control apparatus of this embodiment basically belongs to the third and seventh aspects of the present invention in FIGS. 6 and 10. The vibration control apparatus comprises a state detecting means I, a control means II, a driving means III, and an actuator means IV. The control means II comprises a state discriminating means $II_{11}$, a gain selecting means $II_{12}$, an optimal target control force calculating means $II_{13}$, a difference calculating means $II_3$, a signal control means $II_4$, and an integrating means $II_5$.

Figure 12B:
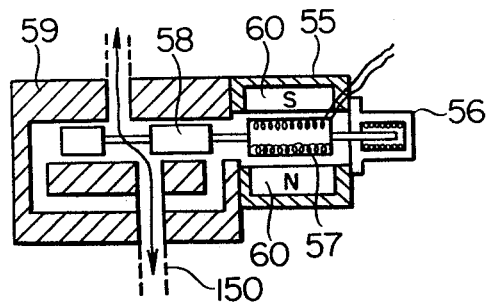
FIG. 12(b) is a sectional view of an actuator means 2 in the first embodiment of the present invention.
Figure 13:
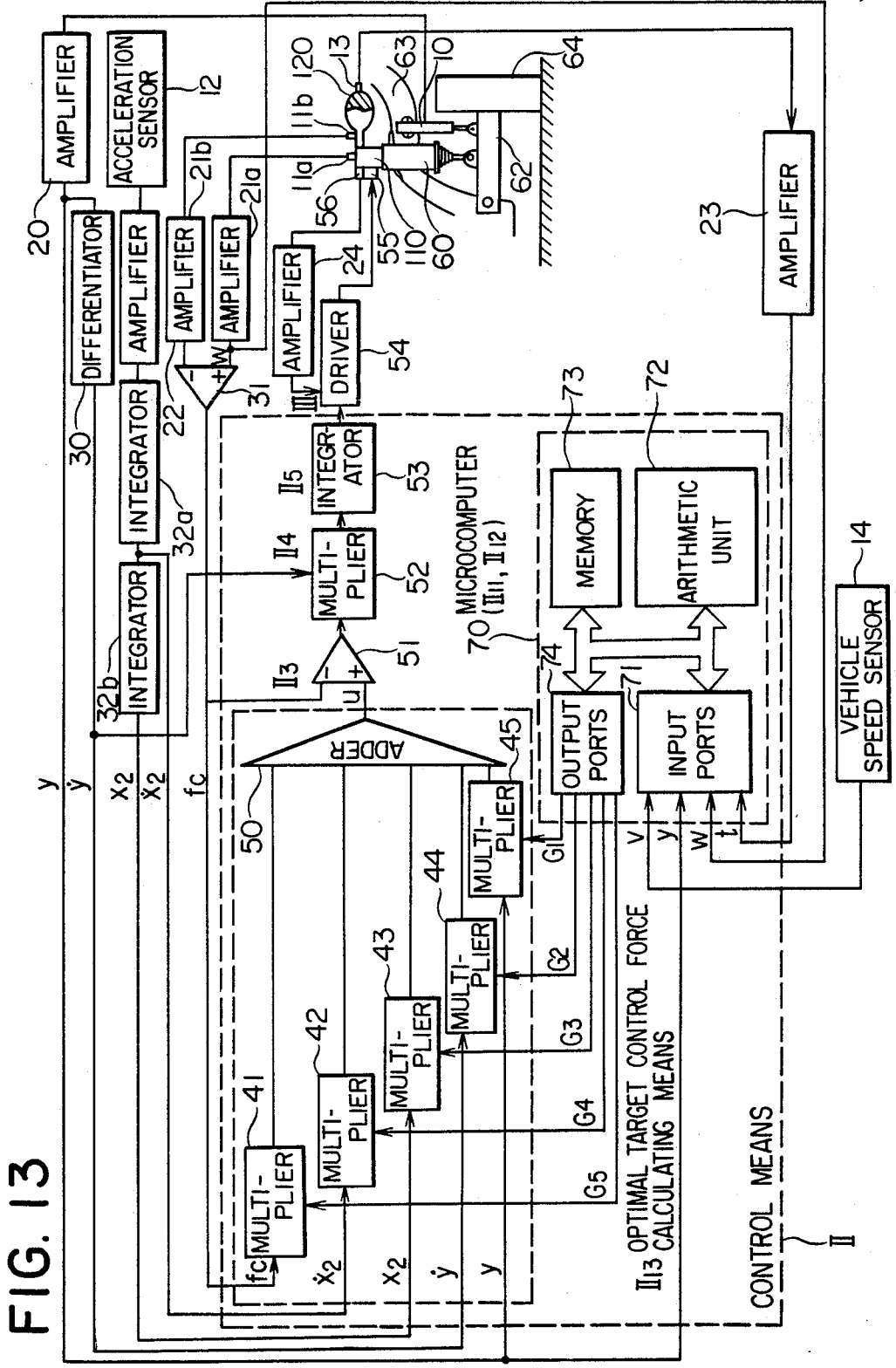
FIG. 13 is a block diagram showing the overall system configuration of the first embodiment of the present invention.

As shown in FIG. 13, the state detecting means I comprises a potentiometer 10, an amplifier 20, a differentiator 30, a pressure sensor 11a, an amplifier 21a, a pressure sensor 11b, an amplifier 21b, a differential amplifier 31, an acceleration sensor 12, an amplifier 22, an integrator 32a, an integrator 32b, a temperature sensor 13, an amplifier 23 a vehicle speed sensor 14, a displacement sensor 56, and an amplifier 24. The potentiometer 10 is inserted between a body frame 63 and a suspension arm 62 for rotationally supporting the corresponding vehicle wheel and detects a relative displacement. The amplifier 20 is connected to the potentiometer 10 and outputs a signal representing a relative displacement y between the axle and the body during traveling of the vehicle. The differentiator 30 differentiates the relative displacement y output from the amplifier 20 and detects a relative speed ẏ. The pressure sensor 11a is mounted in the chamber of the hydraulic cylinder 110 and detects a vehicle load. The amplifier 21a detects a vehicle load w from the pressure output from the pressure sensor 11a. The pressure sensor 11b is arranged in the inlet port of the hydraulic chamber of the accumulator 120 and detects a damping force. The amplifier 21b is connected to the pressure sensor 11b to detect its output. The differential amplifier 31 detects as a damping force fc a difference between the outputs from the amplifiers 21a and 21b. The acceleration sensor 12 is mounted on the body to detect acceleration sensor 12 to amplify acceleration signals. The integrator 32a integrates the output from the amplifier 22 to detect a sprung speed $\dot{x}_2$. The integrator 32b integrates an output from the integrator 32a to detect a sprung displacement $x_2$. The temperature sensor 13 is mounted in the gas chamber in the accumulator 120 and detects a gas temperature t. The amplifier 23 is connected to the temperature sensor 13 to detect an output from the temperature sensor 13. The vehicle speed sensor 14 is mounted on the output shaft of the vehicle transmission to detect a vehicle speed v. The amplifier 24 outputs a signal representing the displacement. The displacement sensor 56 detects a displacement of a spool 58 serving as a variable orifice continuously opening/closing the hydraulic path 150 in the actuator means IV consisting of a linear actuator 55 and a valve body 59, as shown in FIG. 12(b).

The state discriminating means $II_{11}$ and the gain selecting means $II_{12}$ comprises a microcomputer 70 including input ports 71 for receiving the vehicle speed v, the relative displacement y, the wheel load w, and the gas temperature t, an arithmetic unit 72 for discriminating a state on the basis of the inputs and selecting an optimal gain, a memory 73 for storing optimal gains and an algorithm of the arithmetic operation circuit 72, and output ports 74 for outputting the optimal gain selected by the arithmetic unit 72.

Figure 14:
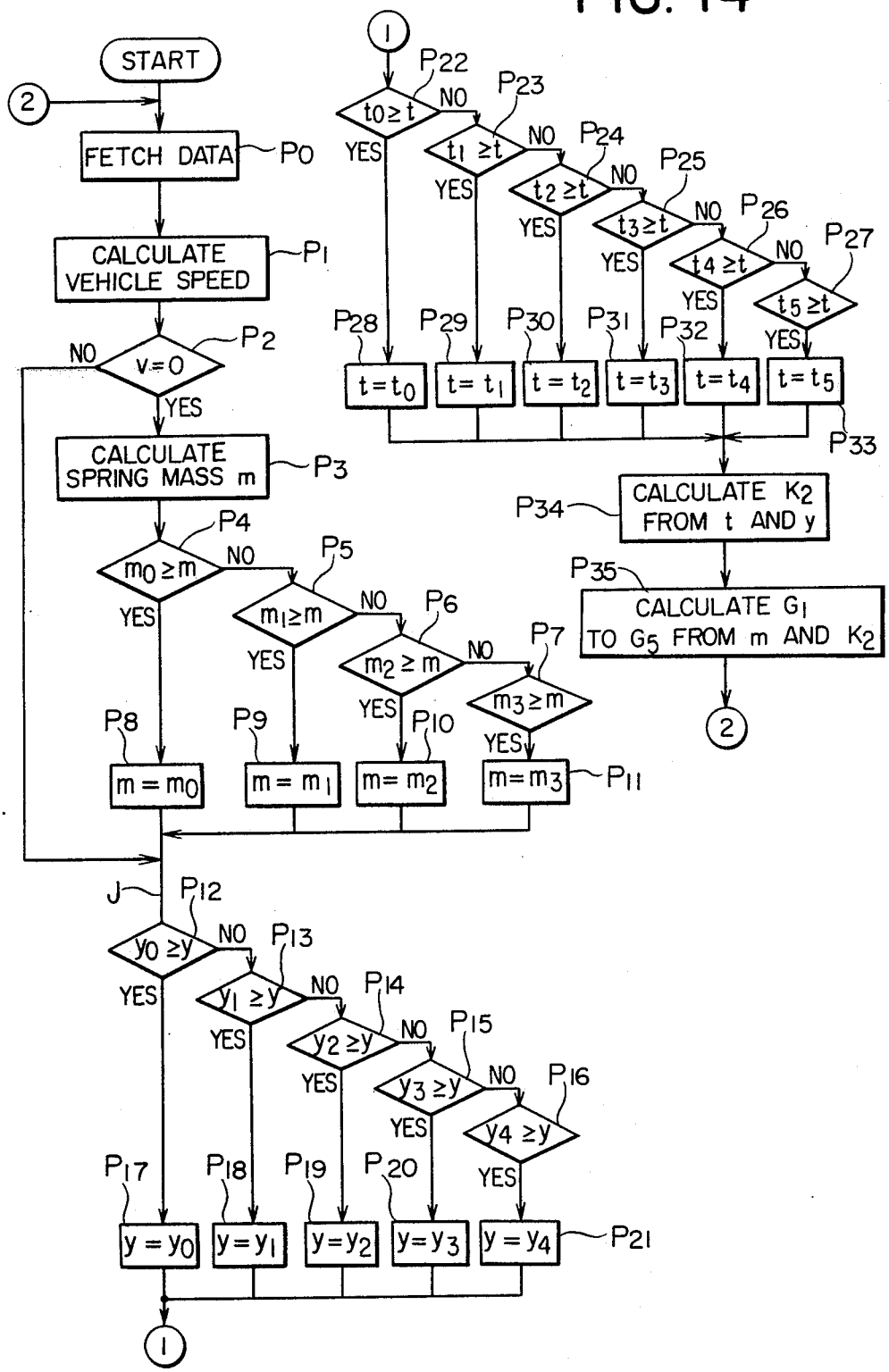
FIG. 14 is a flow chart for explaining the operations of a state detecting means I and a gain selecting means $II_{12}$ in the first embodiment of the present invention.
Figure 15A:
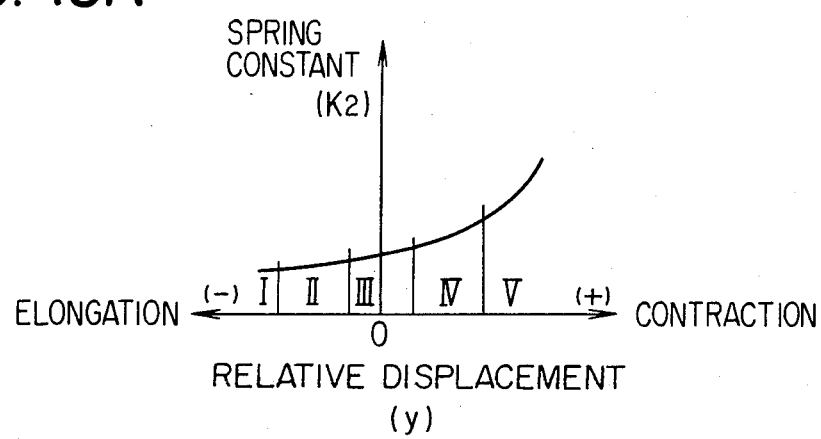
FIGS. 15(a)–15(c) are graphs showing the relationship between the hydropneumatic spring characteristics and the spring constant in the first embodiment of the present invention.
Figure 15B:
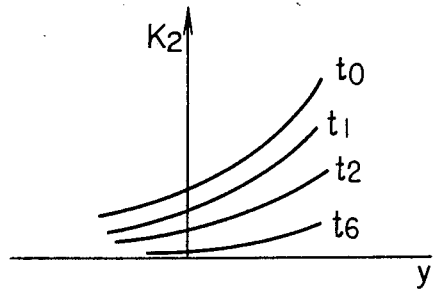
Figure 15C:
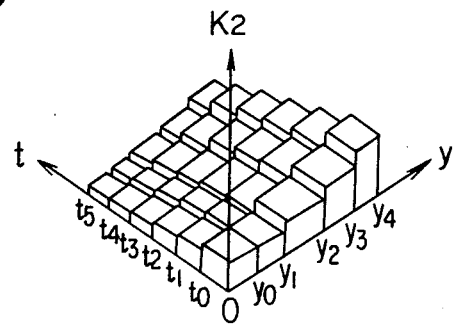

The functions of the microcomputer 70 will be described in detail with reference to the flow chart of FIG. 14. In step Pl, the output from the vehicle speed sensor is fetched to calculate a vehicle speed v in order to detect a sprung mass m of the hydropneumatic suspension, that is, the number of passengers, or the vehicle weight changing according to the load. In step P2, the calculated vehicle speed v is compared (P2) with a reference vehicle speed v=0 to discriminate the stop state of the vehicle since a passenger gets in/off the vehicle or a load is loaded/unloaded at the time of stop (v=0). If YES in step P2, i.e., the discrimination result indicates the stop of the vehicle, the vehicle load w is fetched to calculate the sprung mass m in step P3. The decision steps (P4 to P7) are performed to classify the magnitude of the calculated sprung mass m into one of the ranges m0 to m3. If YES in one of the steps P4 to P7, the calculated mass m is set to be one of the ranges m0 to m3 (step P8, P9, P10, or P11). If NO in step P2, i.e., the microcomputer determines that the vehicle is travelling, and the sprung mass m is determined not to have changed. The flow jumps (J) to the selected decision block out of steps P8 to P11. The relative displacement y is then fetched and classified as one of the five relative displacement y levels (steps P12 to P16) since the spring constant $k_2$ of the hydropneumatic spring 120 is changed, as shown in FIG. 15(a). The one of the relatively displacements y0 to y4 is set to be the detected displacement y (step P17, P18, P19, P20, or P21). The gas temperature t of the hydropneumatic spring 120 is determined and classified as one of six temperature t ranges (P22 to P27) since the spring constant $k_2$ is changed by the change in gas temperature t, as shown in FIG. 15(b). One of the temperature ranges t0 to t5 is set to be the measured temperature t (step P28, P29, P30, P31, P32, or P33). The classified y and t are used to select an optimal $k_2$ (P34), as shown in FIG. 15(c). The selected $k_2$ and the classified m are used to set the vehicle suspension to be a linear two-variable model. Assuming active control, the $k_2$ and m are combined according to a linear square optimal control method to calculate optimal gains $G_1$ to $G_5$ respectively corresponding to the relative displacement y, the relative speed ẏ, the sprung displacement $x_2$, the sprung speed $\dot{x}_2$, and the damping force fc. The optimal gains $G_1$ to $G_5$ are read out from the memory 73 and are output from the output unit 74 (P35).

The optimal target control force calculating means $II_{13}$ comprises five multipliers 41 to 45 and an adder to calculate the optimal target control force u using state signals corresponding to the optimal gains $G_1$ to $G_5$ output from the output ports 74 in the microcomputer 70 according to the following equation:

$$u = G_1 \cdot y + G_2 \cdot \dot{y} + G_3 \cdot x_2 + G_4 \cdot \dot{x}_2 + G_5 \cdot fc \qquad (9)$$

The difference calculating means $II_3$ comprises a subtracter 51 for calculating a difference ε between the damping force fc and the optimal target control force u output from the optimal target control force calculating means $II_{13}$.

The sign control means $II_4$ comprises a multiplier 52 for multiplying the output ε from the subtracter 51 with the suspension relative speed ẏ. The multiplier 52 discriminates whether the difference for the target control force u can be controlled by the damping force so as to achieve damping force control in response to the difference ε. If possible, the multiplier 52 outputs a signal for determining an increase/decrease in damping force. However, if control is impossible, the multiplier 52 generates a signal to set the damping force to zero.

The sign control function of the multiplier 52 will be described with reference to the table below and FIG. 12(a).

TABLE

| Relative Speed ẏ | Positive (Contracted) | | Negative (Stretched) | | | |
|---|---|---|---|---|---|---|
| Target Control Force u | positive | | negative | positive | | negative |
| Control Based on u | possible | | impossible | | | possible |
| Difference ε = u − fc | positive | negative | negative | positive | positive | negative |
| Multiplier Output εẏ | positive | negative | negative | negative | negative | positive |
| Increase/Decrease in Damping Force fc | increase | decrease | decrease | decrease | decrease | increase |
| Direction of Orifice Opening | closing | opening | opening | opening | opening | closing |

The upward direction perpendicular to the vehicle is defined as a positive direction of the target control force u, and the direction of contraction of the hydropneumatic suspension is defined as a positive direction of the relative speed ẏ of the suspension. Assume that the directions of the target control force u and the relative speed ẏ are the same, e.g., the piston of the hydraulic cylinder 110 is moved upward (i.e., the positive direction), and the direction of the signal of the target control force u is positive (i.e., the upward direction). In this case, the compressed oil in the hydraulic cylinder 110 is supplied to the hydropneumatic spring 120 through the orifice 130 in proportion to the relative speed ẏ. By changing the opening of the orifice 130 in response to a control signal, the magnitude of the pressure in the hydraulic cylinder 110, that is, the damping coefficient or the increasing (positive direction) damping force fc can be changed. In this case, if the output ε from the subtracter 51 is positive (u>fc), a control signal is output such that the direction of the orifice opening is the closing direction to increase the damping coefficient and hence the damping force. However, if the output ε is negative (u<fc), the control signal is output such that the direction of the orifice opening is the opening direction, and the damping coefficient and hence the damping force are reduced. However, if the piston of the hydraulic cylinder 110 is moved downward (i.e., the negative direction) and the target control force u signal is negative (the downward direction), the compressed oil is supplied from the hydropneumatic spring 120 to the hydraulic cylinder 110 through the orifice. The orifice opening is controlled to change the decreasing (negative direction) damping force fc. In this case, if the difference ε is positive (−u>−fc), a control signal is output such that the direction of the orifice opening is the opening direction, and that the damping coefficient and hence the damping force are decreased. However, if the difference ε is negative (−u<−fc), then the control signal is output such that the direction of the orifice opening is the closing direction and that the damping coefficient is increased to equivalently increase the damping force acting on the suspension. Therefore, if the target control force signal u and the suspension relative speed ẏ have the same directions, the damping force fc can be controlled on the basis of the target control force u. However, if the directions of the target control force u and the relative speed ẏ are opposite, e.g., if the direction of the piston of the hydraulic cylinder 110 is upward (i.e., the positive direction) and the direction of the target control force u is downward (i.e., the negative direction), the compressed oil is supplied from the hydraulic cylinder 110 to the hydropneumatic spring 120 through the orifice. In this case, if the orifice has a predetermined opening (i.e., control is not performed), the increasing (positive direction) damping force acts together with the relative speed ẏ. As a result, the damping force cannot be controlled on the basis of the target control force u.

If the damping force fc of the positive direction acting equivalently to the suspension is reduced by minimizing the damping coefficient upon full opening of the orifice in response to the control signal, a force in the direction of the target control force u acts on the damping force fc for no control. In other words, the damping force for no control is consequently reduced. In this case, the output ε (=u−fc) from the subtracter 51 is always negative since the target control force u is negative and the direction of the fc is the same as that of the relative speed ẏ.

If the piston of the hydraulic cylinder 110 is moved downward (the negative direction) and the direction of the target control force u is upward (the positive direction), the damping force cannot be controlled on the basis of the target control force u in the same manner as described above. The orifice is fully opened in response to the control signal to minimize the damping coefficient, thereby reducing a damping force equivalently acting on the suspension. In this case, the output ε (=u−fc) from the subtracter 51 is always positive since the target control force u is positive and the direction of the fc is the same (negative) as that of the relative speed ẏ. Therefore, if the direction of the target control force u is opposite to that of the relative speed ẏ, the damping force cannot be controlled on the basis of the target control force u. In this case, the orifice is fully opened in response to the control signal to reduce the damping force.

The control directions of the damping forces for the outputs $\epsilon$ from the subtracter 51 in different states and for the orifice openings are summarized in the above table. In order to basically achieve this logic, the sign of the difference $\epsilon$ is multiplied with the sign of the suspension relative speed $\dot{y}$ having the same direction as that of the damping force, so that the output serves as a control signal corresponding to the control direction of the orifice opening. In this case, the control signal determines only the direction, i.e., an increase or decrease in damping force. In order to increase an S/N ratio, i.e., a ratio of noise to the difference signal $\epsilon$ for the target control force, the multiplier 52 directly multiplies the relative speed $\dot{y}$ with the difference $\epsilon$ to obtain a control signal $\epsilon\dot{y}$.

The integrating means $II_5$ comprises an operational amplifier and an integrator consisting of a resistor R and a capacitor C to determine an integration gain. The integrating means $II_5$ integrates the output $\epsilon\dot{y}$ from the multiplier 52 as a function of time to detect a suspension damping force so as to eliminate an offset (i.e., a residual difference) of the difference $\epsilon$ between the target control force u and the damping force fc. The detected damping force is fed back to the integrating means $II_5$. At the same time, in the integrating means $II_5$, the integration gain $K_k$ ($=1/CR$) is set to be 2400 in favor of responsiveness and stability of the control system. In order to prevent the drift of the integrator itself, an output therefrom is fed back to the input thereof through a resistor.

The driving means III comprises a driver 54 for negatively feeding back a spool displacement signal from the actuator means IV to the output from the integrator 53 and for outputting a current proportional to the difference signal.

The actuator means IV comprises: a valve body 59 integrally formed with the hydraulic cylinder 110 of the hydropneumatic suspension mounted between the suspension arm 62 and the body frame 63; a hydraulic path 150 for allowing communication between the oil chamber of an accumulator 120 and the oil chamber of the hydraulic cylinder 110 through the valve body 59; a spool 58 serving as a variable orifice for continuously opening/closing the hydraulic path 150; a moving coil 57 of a linear actuator 55 integrally formed with the spool 58; a permanent magnet 60 for applying a magnetic field to the moving coil in response to a current as an output from the driver 54 representing the current through the moving coil; a displacement sensor 56 mounted on the linear actuator 55 to control the force acting on the moving coil; and an amplifier 24 for outputting a displacement signal.

Figure 16:
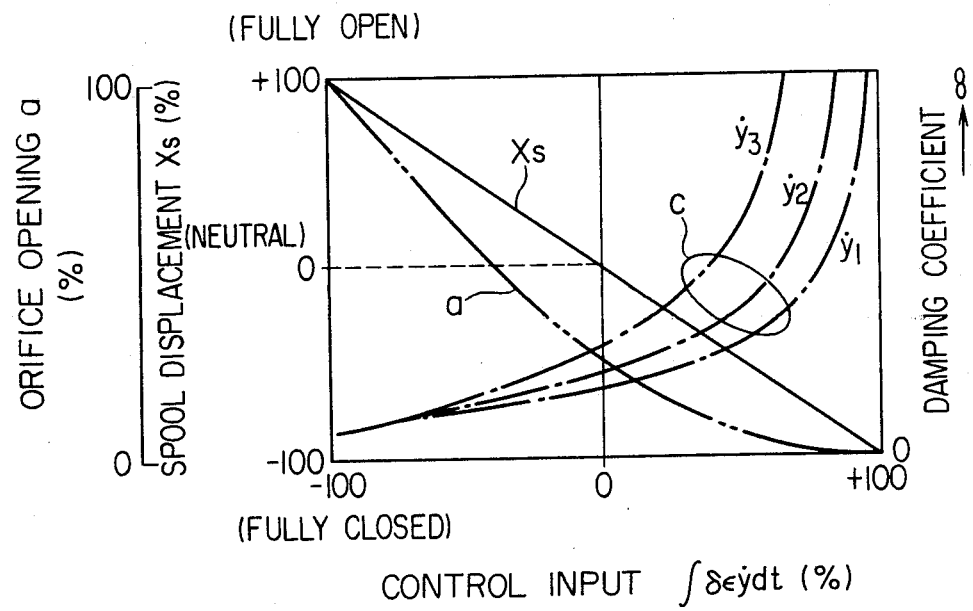
FIG. 16 is a graph showing the relationship between the spool displacement and the damping coefficient with respect to the output from a control means II in the first embodiment of the present invention.

The movement of the spool upon application of an integrated value $\int\epsilon\dot{y}dt$ obtained by integrating the output $\epsilon\dot{y}$ (i.e., the control input to the actuator means) from the multiplier 52 in the control means II will be described with reference to FIG. 16. The control input $\int\epsilon\dot{y}dt$ is plotted along the abscissa of FIG. 16, and the spool displacement xs, the orifice opening a and the damping coefficients C for the spool displacement are plotted along the ordinate in FIG. 16. If the control input $\int\epsilon\dot{y}dt$ is zero, the spool displacement signal is fed back to the driver to keep the spool displacement xs to be a neutral position (i.e., 0%) in order to assure driving comfort. Therefore, the orifice opening, i.e., the damping coefficient C which assure driving comfort is given. In this case, the value of the damping coefficient C is a function of the suspension relative speed $\dot{y}$. If the multiplier 52 generates a positive output $+\epsilon\dot{y}$, the control input is also positive, i.e., $+\int\epsilon\dot{y}dt$). The spool is moved from the neutral position to the full closing position (xs=$-100\%$) of the hydraulic path 150 on the basis of the multiplier output $\epsilon\dot{y}$. The orifice opening a is reduced to increase the damping coefficient C and hence the damping force. However, if the multiplier 52 generates a negative output $-\epsilon\dot{y}$, the control input is also negative, i.e., $-\int\epsilon\dot{y}dt$. the spool is moved from the neutral position to the full opening direction (xs=$+100\%$) of the hydraulic path 150 on the basis of the multiplier output $\epsilon\dot{y}$. As a result, the orifice opening a is increased, and thus the damping coefficient C and the damping force are reduced.

The operation of the first embodiment will be summarized below.

In response to the external force or disturbance from the road surface, the microcomputer 70 outputs the optimal gains $G_1$ to $G_5$ of the relative displacement y, the relative speed $\dot{y}$, the sprung displacement $x_2$, and the damping force fc on the basis of the output $v$ from the vehicle speed sensor 14, the wheel load w detected by the amplifier 21a, the relative displacement y detected by the linear potentiometer, and the gas temperature t detected by the temperature sensor 13. The optimal target control force u is calculated according to equation (9) and is output from the adder 50. A difference between the target control force u and the damping force fc to be controlled is calculated. The difference is multiplied with the relative speed by the multiplier 52 to obtain a damping force control signal. The control signal is supplied to the integrator 53 and the driver 54. The output current from the driver 54 is supplied to the linear actuator 55 to move the spool 58. Therefore, the damping coefficient and hence the damping force fc are continuously changed.

In the apparatus operated as described above, the nonlinear spring constant kc of the hydropneumatic spring is instantaneously changed in response to the relative displacement y and the gas temperature t. At the same time, the optimal target control force u as the multiplier output is output from the adder 50. The difference between the target control force u and the damping force fc is calculated. The difference is multiplied with the relative speed by the multiplier 52. The damping force control signal from the multiplier 52 is supplied to the integrator 53 and the driver 54. A current from the driver 54 is supplied to the linear actuator 55 to move the spool 58. Therefore, the damping coefficient and hence the damping force fc are continuously changed.

In the apparatus operated as described above, the nonlinear spring constant kc of the hydropneumatic spring is instantaneously detected on the basis of the relative displacement y and the gas temperature t. At the same time, the sprung mass m corresponding to the change in vehicle weight in the case of getting on/off of the passenger from the vehicle or loading/unloading the load into or from the vehicle. The optimal gain can be always selected by the linear model. The damping force fc can be continuously controlled in response to the signal of the optimal target control force u calculated by the linear model. Therefore, the apparatus can be adaptively used in any traveling states. In addition, driving comfort and stability can be greatly improved.

The multiplier 52 in the sign control means $II_4$ calculates the product $\epsilon\dot{y}$ between the suspension relative speed $\dot{y}$ and the difference $\epsilon$ for the target control force.

As compared with the difference ε, the signal level is improved, so that the S/N ratio of the control signal εẏ can be improved. In addition, the control signal is integrated by the integrator 53 as a function of time, so that the offset (the residual difference) can be eliminated when the unstable component (0.2 to 2) of the vibrations on the sprung mass is set to an optimal vibration level. Therefore, damping force control tracing the unstable component of the target control force u can be achieved to obtain the optimal vibration level. At the same time, the gain is small against high-frequency noise adversely affecting damping force control. The gain is large for the frequency requiring vibration control. In this manner, stability of the control system can be improved.

The actuator means II$_4$ for controlling the damping force fc feeds back the spool displacement instead of using a return spring against the force generated by the linear actuator. The spool can be moved by small electric energy, and the force generated thereby can be effectively used to improve response characteristics. Control can be performed for even small vibrations with high frequencies. The power source such as a hydraulic source or a pneumatic source need not be used, and the weight, space, and cost of the piping can be advantageously reduced.

The sign control means II$_4$ in this embodiment comprises the multiplier 52 but may comprise a divider.

Second Embodiment

Figure 17:
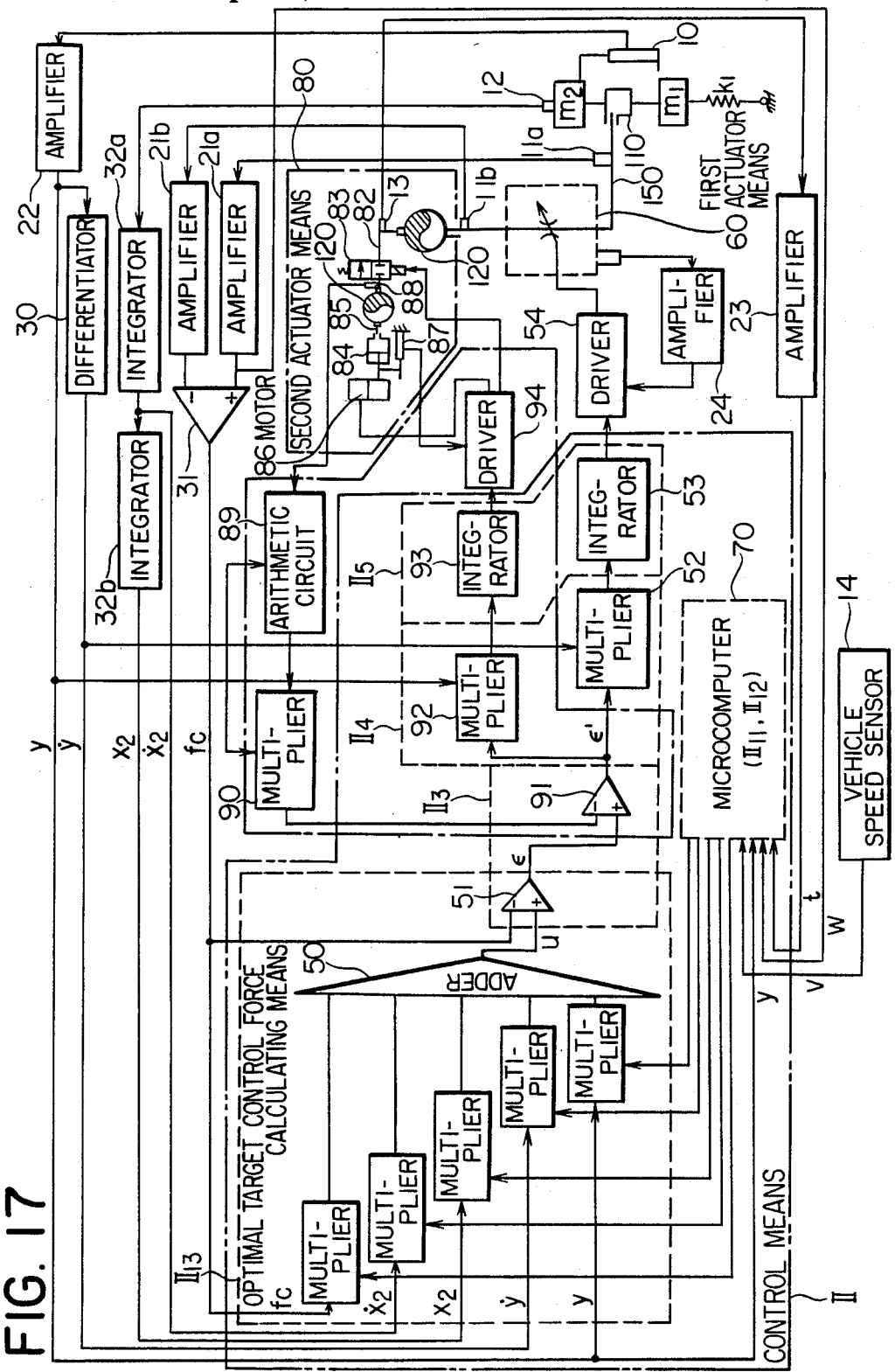
FIG. 17 is a block diagram showing the overall system configuration of a second embodiment of the present invention.

A second embodiment exemplifies an automobile hydropneumatic suspension apparatus as in the first embodiment by applying the seventh aspect (FIG. 13) of the present invention thereto. The suspension apparatus of the second embodiment is arranged as shown in FIG. 17. As compared with the first embodiment in FIG. 13, a second actuator means 80 surrounded by the alternate long and short dashed line and control means 89 to 94 therefor are added. Other arrangements of the second embodiment are substantially the same as those of the first embodiment. In addition to continuous control of the damping force of the first embodiment, the spring constant of the hydropneumatic spring is positively changed, and a 90°-phase shifted spring force is used. Therefore, the disabled state of the control force is compensated by the combination of the damping force fc and the spring force f$_k$ which are 90°-phase shifted from each other. The additional second actuator means 80 and the control means 89 to 94 therefor, and damping force continuous control different from that of the first embodiment will be mainly described below.

The second actuator means 80 is arranged in the following manner. A means for changing a spring constant k$_2$ of an accumulator 120 as the hydropneumatic spring comprises a high-pressure gas source required for changing the pressure of the gas chamber and an auxiliary accumulator 120' as a recovery source therefor. Piping 82 is arranged to allow communication between the gas chambers of two accumulators 120 and 120'. An electromagnetic selector 83 is arranged midway along the piping 82 to seal the gas in the gas chamber in the accumulator 120 or to allow communication between the gas chambers of the accumulators 120 and 120'. If the electromagnetic selector 83 is turned on, i.e., the chambers of the accumulators 120 and 120' communicate with each other, in order to change the gas pressure is changed, a second hyraulic cylinder 84 is arranged to exhaust the oil from the oil chamber of the auxiliary accumulator 120' and to change the gas volume. Piping 85 is disposed to allow communication between the oil chamber of the auxiliary accumulator 120' and the second hydraulic cylinder 84. An electric motor 86 is arranged to reciprocate the piston of the second hydraulic cylinder 84.

The control means for the second actuator means 80 is arranged as follows. The control means comprises a potentiometer 87, a pressure meter 88, an arithmetic circuit 89, a multiplier 90, a second subtracter 91, a multiplier 92, an integrator 93, and a driver 94. The potentiometer 87 detects a piston displacement of the second hydraulic cylinder 84 since the piston displacement is used as an ON/OFF control signal of the electromagnetic selector 83. The pressure meter 88 is mounted in the gas chamber of the auxiliary accumulator 120' to detect a gas sealing pressure p of the accumulator 120 which is required for calculation of the spring constant k$_2$. The arithmetic circuit 89 calculates the spring constant k$_2$ on the basis of the gas sealing pressure p and the relative displacement y according to the following equation:

$$k_2 = K\{(p-cy)^{1.4}\}/p^{2.4} \qquad (10)$$

where K and c are constants.

The multiplier 90 multiplies the calculated spring constant k$_2$ with the relative displacement y to detect a spring force f$_k$ acting on the hydropneumatic suspension. The second subtracter 91 calculates a difference ε'(=u−(fc+f$_k$)) between the optimal target control force u calculated by the subtracter 51 (the first embodiment) and the sum of the damping force fc and the spring force f$_k$ which is 90°-phase shifted from the difference ε between the optimal target control force u and the damping force fc. The multiplier 92 multiplies the difference εε' with the relative displacement y and serves as the sign control means II$_4$. The integrator 93 serves as an integrating means II$_5$. The integrator 93 integrates an output ε'y from the multiplier 92 to eliminate the offset (the residual difference) of the control amount. At the same time, the integrator 93 stabilizes the control system. The driver 94 serves as the driving means for outputting a signal for controlling the second actuator means.

The function of the multiplier 92 is the same as that of the first embodiment. The relative displacement y is multiplied with the difference ε'. In the control mode for increasing the spring force f$_k$, i.e., to increase the spring constant, the multiplier 92 outputs ε'y>0. However, in the control mode for reducing the spring force f$_k$, i.e., to decrease the spring constant, the output ε'y<0 is generated.

Figure 18:
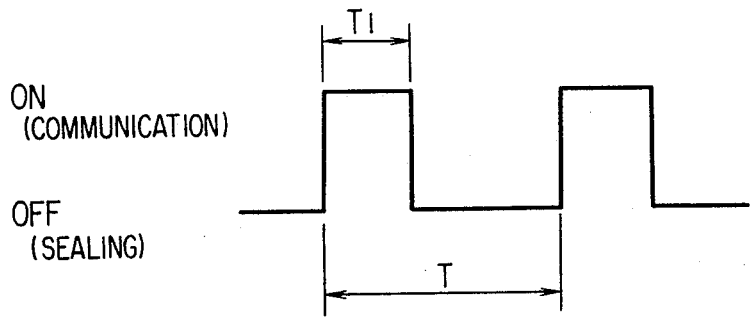
FIG. 18 is a timing chart for pulse width modulation in a driving means III in the second embodiment of the present invention.

The driver 94 comprises means for driving the electric motor 86 on the basis of the integrator 93 and control means for controlling the electromagnetic selector 83. The control means for the electromagnetic selector 83 differentiates the output from the potentiometer 87 and performs pulse width modulation (PWM) with the absolute value of the differentiated signal. If the absolute value of the differentiated signal is zero (i.e., the piston is stopped), the spring constant need not be changed. As shown in FIG. 18, the duty ratio (T$_1$/T) of the carrier frequency (1/T Hz) is always set to be zero to keep the electromagnetic selector 83 off, as shown in FIG. 18. The duty ratio (T$_1$/T) is increased according to an increase in absolute value of the differentiated output, and the ON time (T$_1$) of the electromagnetic selector 83 is increased. At a level exceeding the absolute value of the given differentiated output, the duty ratio ($T_1/T$) is fixed, and the gas of the gas chamber of the accumulator 120 is periodically sealed and exhausted.

In continuous damping force control of the first embodiment, the difference $\epsilon$ between the damping force fc and the target control force u as the output from the subtracter 51 is used. In addition to this, in this embodiment, the difference between the difference $\epsilon$ and the spring force $f_k$ phase-shifted from the damping force fc is calculated by the second subtracter 91. The output $\epsilon'$ from the subtracter 91 is used to perform the same operation as in the first embodiment.

The operation of the second embodiment having the above arrangement will be described below.

The difference $\epsilon$ between the optimal target control force u calculated in response to the external force or disturbance from the road surface and the sum of the damping and spring forces fc and $f_k$ is output from the second subtracter 91. The difference is multiplied with the relative speed and displacement $\dot{y}$ and y by the multipliers 51 and 92 to obtain damping and spring force control signals. These signals are supplied to the integrator 93 and the driver 94 to supply a current to the electric motor 86, thereby reciprocating the piston of the second hydraulic cylinder 84. At the same time, on the basis of the piston displacement, the electromagnetic selector 83 is turned on/off at the suitable timings in response the PWM-modulated signal. If the electromagnetic selector 83 is turned on, i.e., if the gas chambers of the accumulators 120 and 120' communicate with each other, the changes in volumes of the gas chambers upon reciprocal operation of the piston change the pressures (the laws of Boyle and Charles). When the electromagnetic selector is turned off, the compressed gas is sealed in the gas chamber of the accumulator 120 to change the spring constant and hence the spring force $f_k$. Therefore, the spring force can be continuously and variably controlled so as to compensate for the force which cannot be generated by the damping force having a phase different from the spring force for the target control force u.

The damping force control signal from the multiplier 52 is supplied to the integrator 53 and the driver 54 to drive the first actuator means, thereby supplying a current from the driver 54 to the linear actuator 55. The spool 58 is then moved to change the damping coefficient and hence the damping force. Therefore, the damping force fc can be continuously and variably controlled so as to compensate for the control force which cannot be generated by the spring force $f_k$ having a phase different from that of the damping force.

In addition to the effect of the first embodiment, the apparatus operated described above according to the second embodiment can compensate for the optimal target control force u by the damping and spring forces fc and $f_k$ which are 90°-phase shifted from each other. Assume that the piston of the hydraulic cylinder 110 in FIG. 12(a) is vibrated in a sinusoidal wave when the intermediate position of the entire stroke is the center. In this case, when the piston reaches before the upper (lower) dead center of the vibration, the suspension speed $\dot{y}$ is near zero. When the orifice is fully closed, the magnitude of the damping force is small. The target control force u cannot be obtained by only the damping force. However, the spring force depending on the suspension relative displacement y can be increased since the displacement y is large. If the damping force is added to the spring force, the force can be compensated for the target control force u. If the piston is located in the neutral position, the target control force u cannot be sufficiently obtained by only the spring force since the displacement y is small. In this case, the damping force can be increased with a small orifice opening since the relative speed is maximum. Therefore, if the damping force is added to the spring force in the same manner as described above, the force which cannot be compensated for the target control force u can be compensated by the damping force. Control of this embodiment can substantially achieve the control effect by active control to improve driving comfort and stability. At the same time, since the electric motor 86 is used for controlling the spring force, a power source having large energy consumption need not be used.

The means for changing the spring constant $k_2$ is achieved by changing a pressure of a gas sealed in the accumulator 120. In this case, the gas is supplied or exhausted by the auxiliary accumulator 120', the gas is not consumed, and thus the gas source can be omitted, thereby reducing the space, cost of the gas source.

Third Embodiment

Figure 19:
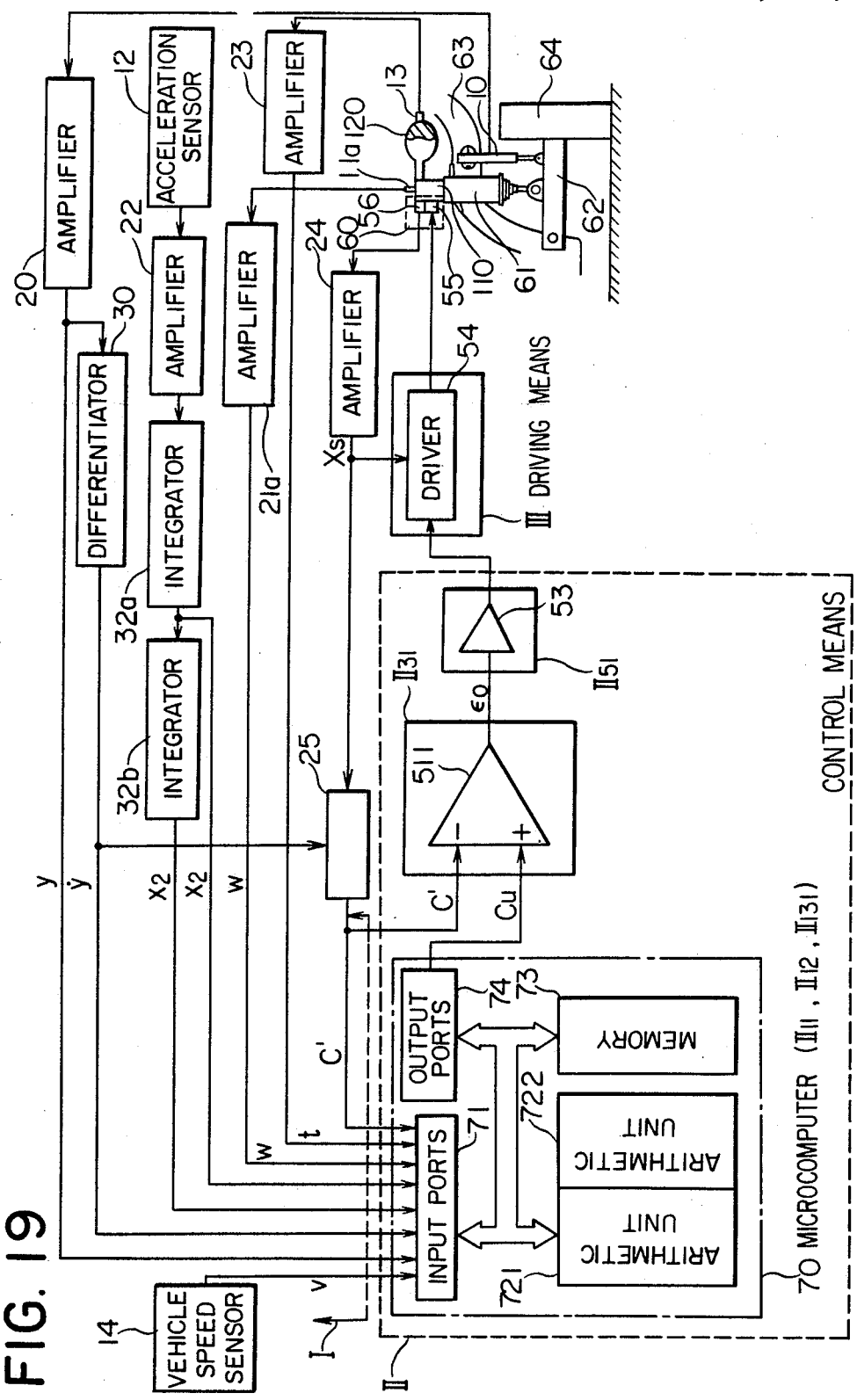
FIG. 19 is a block diagram showing the overall system configuration of a third embodiment of the present invention.

A third embodiment exemplifies an automobile hydropneumatic suspension apparatus in the same manner as in the first embodiment of FIG. 13 when the eighth aspect is applied thereto. The overall arrangement of the suspension apparatus is illustrated in FIG. 19. A control means II in FIG. 19 is different from that of the first embodiment in FIG. 13. Other arrangements of the third embodiment are the same as those of the first embodiment, and a detailed description thereof will be omitted.

A state detecting means I comprises the displacement sensor 56 for detecting the displacement of the spool 58 in the actuator means IV (FIG. 12(b)) and the amplifier 24 for outputting the displacement signal as well as sensors and amplifiers for producing the wheel load, the acceleration, the temperature, the vehicle speed, the relative displacement, the relative speed, the sprung displacement derived from the acceleration, and the sprung speed. However, the state detecting means I does not comprise the pressure sensor mounted at the inlet port of the oil chamber of the accumulator 120 to detect the damping force and the amplifier for amplifying the output from the pressure sensor. The apparatus of FIG. 19 additionally comprises an arithmetic unit 25 for calculating the relative speed $\dot{y}$ obtained by differentiating the displacement y by the differentiator 30 and the damping coefficient C' derived from the spool displacement as the output from the amplifier 24.

Figure 20:
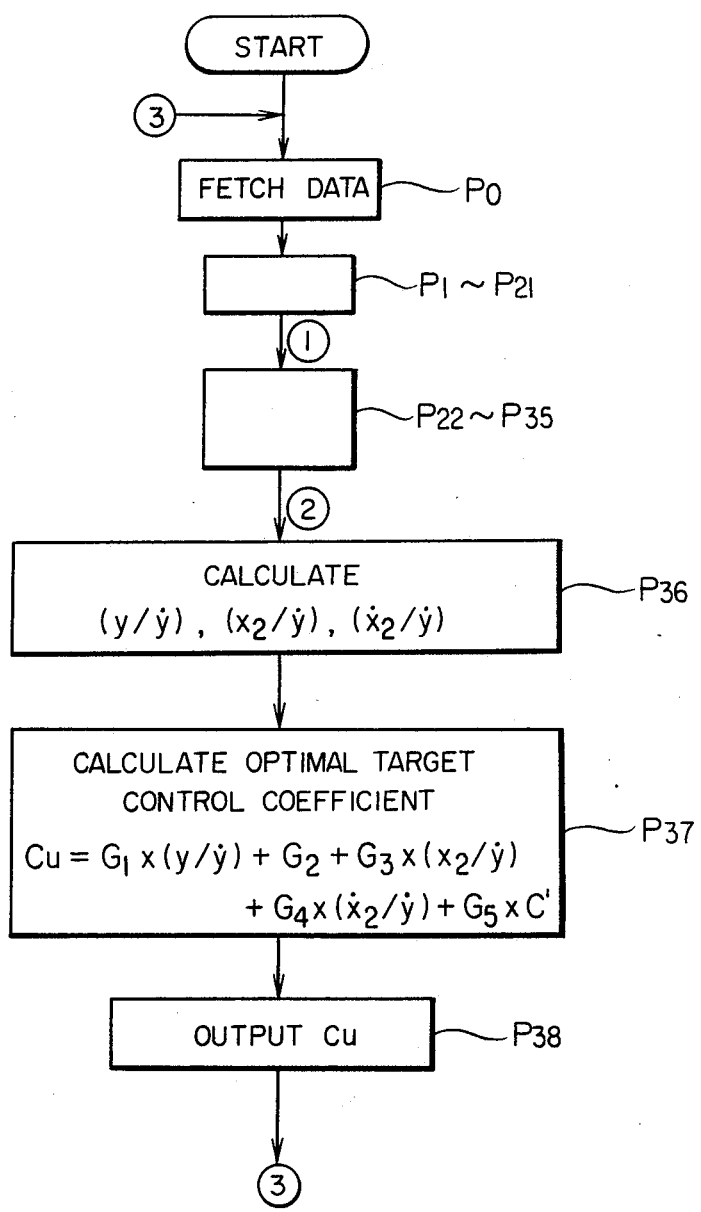
FIG. 20 is a flow chart for explaining the operation of a target control coefficient calculating means $II_{131}$.

The control means II comprises a microcomputer 70 having functions of a state discriminating means $II_{11}$, a gain selecting means $II_{12}$, and a target control coefficient calculating means $II_{131}$. The microcomputer 70 comprises input ports 71 for receiving the vehicle speed $v$, the relative displacement y, the vehicle load w, and the gas temperature t, a first arithmetic unit 721 for discriminating a state based on input signals and selecting optimal gains, a memory 73 for storing the optimal gains and an algorithm of the first arithmetic unit 721, a second arithmetic unit 722 for calculating target control coefficients of the inputs to the input ports 71 on the basis of the selected optimal gains, and output ports 74 for outputting the calculated target control coefficients. The vehicle suspension is represented by a vibration model, and optimal gains $G_1$ to $G_5$ of the respective state values, i.e., the relative displacement y, the relative speed $\dot{y}$, the sprung displacement $x_2$, the sprung speed $\dot{x}_2$, and the spool displacement $C'$ according to the linear square adaptive control technique. The functions of the microcomputer 70 will be described in detail with reference to a flow chart in FIG. 20.

Steps ① and ② and are steps of state discrimination and optimal gain selection in the same manner as the flow chart of the first embodiment (FIG. 14), and the operations in steps ① and ② are the same thereas.

A target control coefficient Cu is calculated by the target control coefficient calculating means II$_{13}$ by using the optimal gains $G_1$ to $G_5$ from the first arithmetic unit 721 and the outputs from the state detecting means I. More specifically, by using the outputs (i.e., the relative displacement y, the relative speed $\dot{y}$, the sprung displacement $x_2$, and the sprung speed $\dot{x}_2$) of the state detecting means I and the damping coefficient $C'$ derived from the output from the spool displacement sensor in the actuator, the optimal target control coefficient Cu is calculated by the following equation:

$$\begin{aligned} Cu &= G_1(y/\dot{y}) + G_2(\dot{y}/\dot{y}) + G_3(x_2/\dot{y}) + \\ &\quad G_4(\dot{x}_2/\dot{y}) + G_5(C'\dot{y}/\dot{y}) \\ &= G_1(y/\dot{y}) + G_2 + G_3(x_2/\dot{y}) + G_4(\dot{x}_2/\dot{y}) + G_5 C' \end{aligned} \quad (11)$$

The input ports 71 in the microcomputer 70 receive the relative displacement signal y, the relative speed signal $\dot{y}$, the sprung displacement signal $x_2$, the sprung speed signal $\dot{x}_2$, and the damping coefficient $C'$ derived from the output from the spool displacement sensor (P0). The quotients corresponding to the coefficients $(y/\dot{y})$, $(\dot{x}_2/\dot{y})$, and $(\dot{x}_2/\dot{y})$ in equation (10) are calculated (P36). The gain outputs $G_1$ to $G_5$ calculated in step ②, i.e., by the first arithmetic unit 721 as the gain selecting means II$_{12}$ in the microcomputer are read out (P38), and at the same time, these gains $G_1$ to $G_5$ are multiplied with the coefficients $(y/\dot{y})$, $(\dot{x}_2/\dot{y})$, and $(\dot{x}_2/\dot{y})$. The products are added to obtain the optimal target control coefficient Cu (P37), and the coefficient Cu is output (P38).

The difference calculating means II$_{31}$ comprises a subtracter 511 for calculating a difference $\epsilon_0$ between the optimal target control coefficient Cu output from the optimal target control coefficient calculating means II$_{131}$ and the detection damping coefficient C calculated on the basis of the actual output from the spool displacement sensor of the actuator. The difference calculating means II$_{31}$ then discriminates whether the actual spool displacement, i.e., the actual orifice opening is sufficient for the optimal target control coefficient Cu. The difference calculating means II$_{31}$ also discriminates the direction of control, i.e., an increase/decrease in spool displacement according to the sign of the difference $\epsilon_0$.

The output signal $\epsilon_0$ from the subtracter 511 represent divisions between the respective state values in the calculations of the coefficients $(\dot{y}/\dot{y})$, $(\dot{x}_2/\dot{y})$, and $(\dot{x}_2/\dot{y})$ in the process for calculating the optimal target control coefficient. The sign of the signal $\epsilon_0$ signifies the same meaning as the sign of the product and quotient outputs from the sign control means. Therefore, sign control calculations need not be performed in the third embodiment.

A signal amplifying means II$_{51}$ comprises an operational amplifier 53 and proportionally amplifies the output $\epsilon_0$ from the difference calculating means II$_{31}$. The signal amplifying means II$_{51}$ then generates an output signal for the control means II to proportionally control the variable orifice opening so that the damping force is generated accurately according to the target control coefficient.

The operation of the third embodiment will be described below.

In response to an external force or disturbance from the road surface, the microcomputer 70 outputs the optimal gains $G_1$ to $G_5$ respectively for the relative displacement y, the relative speed $x_2$, the sprung displacement $x_2$, the sprung speed $\dot{x}_2$, and the damping force fc on the basis of the output $v$ from the vehicle speed sensor 14, the wheel load w detected by the amplifier 21, and the gas temperature t detected by the temperature sensor 13. The optimal target control coefficient Cu is calculated according to equation (11). The difference between the target control coefficient Cu and the variable orifice control coefficient $C'$ is calculated. The difference signal is supplied to the amplifier 53 and the driver 54. A current is supplied from the driver 54 to the linear actuator 55 to move the spool 58, thereby changing the damping coefficient and hence continuously changing the damping force.

The actual variable orifice opening is proportionally controlled so as to increase/decrease the damping force according to the target control coefficient Cu. Therefore, the accurate, quick tracking characteristics can be obtained.

In the apparatus operated as described above according to the third embodiment of the present invention, the optimal gains are always selected. The optimal target control coefficient Cu is calculated by multiplying the optimal gains, the state values associated with the suspension movement, and the conversion coefficients derived therefrom. In other words, the actuator spool displacement corresponding to the orifice opening for generating the damping force is fed back. The difference between the optimal target control coefficient and the damping coefficient which is used for actual control and which is obtained by feeding back the spool displacement is calculated. On the basis of the difference, the spool displacement for determining the orifice opening for generating the damping force is continuously and proportionally controlled. Integral operations are omitted. High-speed control can be achieved for all traveling states and all road state inputs and disturbance, thereby further improving driving comfort and stability.

Furthermore, the direction, i.e., the increase/decrease in orifice opening can be directly detected by the sign of the difference on the basis of the optimal target control coefficient. High-speed, high-response control can be uniquely achieved without using the sign control means comprising several multipliers and dividers Furthermore, since the displacement of the spool constituting the variable orifice is directly fed back, the spool can be moved by small electric energy. The force generated by the spool can be effectively utilized, and thus high-response control for small vibrations having high frequencies can be achieved. At the same time, the microcomputer as the control means II can be easily constituted. The power source such as a hydraulic or pneumatic source need not be used, and the weight, space, and cost of piping or the like can be advantageously reduced.

In the first and second embodiments, the sprung mass m is detected by the pressure sensor 11a (FIG. 13) at the side of the hydraulic cylinder 110 in the vibration state discriminating means. However, the relative displacement signal y may be used instead.

In each embodiment, the vibration control state signals are limited to the relative displacement y, the relative speed $\dot{y}$, the sprung displacement $x_2$, the sprung speed $\dot{x}_2$, and the damping force fc. However, other state signals may be used. In other words, the number of state signals is not limited to a specific number.

In the above embodiments, operations in the control means II and the optical target control force calculating means are performed by analog circuits. However, the microcomputer 70 used as the state discriminating means and the gain selecting means may also have the functions of the control means II and the optimal target control force calculating means.

In the third embodiment, the control means does not calculate the target control force but the target control coefficient. However, after the target control force is calculated, the target control coefficient may be calculated by using the target control force.

In the eighth aspect of the present invention, the optimal gains for the various state values may be calculated. At the same time, the conversion coefficients $(y/\dot{y})$, $(x_2/\dot{y})$, ... may be calculated and multiplied with the optimal gains, and the products may be added to each other in the same manner as in the third embodiment.

What is claimed is:

1. A vibration control apparatus for a vibrating body supported by a suspension and comprising actuator means for applying a control force to the suspension to control characteristics of the suspension and vibrations of the vibrating body, said apparatus further comprising:

state detecting means comprising a first detecting means associated with the actuator means for detecting a physical value representative of the control force applied by the actuator means and a second detecting means associated with the suspension for detecting a state value representing actual movement of said suspension;

control means including target control force calculating means, detection control force calculating means, and difference calculating means, said target control force calculating means receiving the signals output by said first and second detecting means, for calculating a coefficient in response to optimal target control force in consideration of an external force or disturbance acting on said suspension on the basis of the physical and state values from said first and second detecting means respectively, said detection control force calculating means receiving the signals output from said first detecting means for calculating a coefficient in response to a detection control force corresponding to the physical value from said first detecting means, said difference calculating means being connected to said target control force calculating means and said detection control force calculating means for calculating a difference coefficient representative of a difference between the optimal target control force and the detection control force;

driving means connected to said control means for amplifying the difference coefficient signal output from said difference calculating means of said control means; and said actuator means being connected to said driving means for variably continuously controlling the characteristics of the suspension on the basis of the amplified difference coefficient signal from said driving means, so that the suspension characteristics can be continuously variably controlled to equivalently generate the control force applied to the suspension in response to the external force or disturbance acting on said suspension, said second detecting means of said state detecting means comprising first sensor means for producing a signal representing the damping force of said suspension, said first detecting means comprising second sensor means for producing a signal representing relative vibratory velocity between a suspension member and said vibrating body, said actuator means comprising means for continuously and variably controlling a damping coefficient of the suspension.

2. An apparatus according to claim 1, wherein said means for continuously and variably controlling the damping coefficient comprises an orifice, the opening of which is controlled by an output from said driving means.

3. An apparatus according to claim 1, wherein said control means comprises sign control means for multiplying the difference output signal from said difference calculating means by a signal of suspension motion detected by said state detecting means and for discriminating whether control of the target control force equivalently tracing the suspension movement can be performed, a signal for controlling the suspension characteristics being output in response to an output from said sign control means.

4. An apparatus according to claim 3, wherein said control means further comprises integrating means for eliminating an offset, as a residual difference, of the control value by integrating the output signal from said sign control means as a function of time, the suspension characteristics being controlled in proportion to the magnitude of an output from said integrating means, thereby eliminating the offset causing an error in target control force control in consideration of the external force or disturbance acting on said suspension.

5. An apparatus according to claim 4, wherein said state detecting means comprises third sensor means for producing a signal representing spring force of said suspension and fourth sensor means for producing a signal representing relative vibratory displacement between a suspension member and said vibrating body, and said actuator means comprises means for continuously and variably controlling a spring constant of the suspension.

6. An apparatus according to claim 4, wherein said second detecting means of said state detecting means comprises first and third sensor means for respectively producing signals representing damping and spring forces of said suspension and said first detecting means comprises second and fourth sensor means for respectively producing vibratory velocity and relative displacement between a suspension member and said vibrating body; said control means comprises calculating means for respectively multiplying a difference between the optimal target control force and a sum of the damping and spring forces respectively detected by said first and third sensor means, for integrating products, and for calculating a first output for controlling the damping force and a second output for controlling the spring force; said driving means comprises means for power-amplifying the first and second outputs, and said actuator means comprises first actuator means for continuously and variably controlling the damping coefficient in an actuation enable region in response to a signal obtained by power-amplifying the first output, and second actuator means for continuously and variably controlling the spring constant in an actuator enable region in response to a signal obtained by power-amplifying the second output, the actuation enable regions of said first and second actuator means being compensated.

7. An apparatus according to claim 6, wherein
said control means further comprises detection control force calculating means for adding the signals representing suspension damping and spring forces output by said first and third sensor means to obtain a detecting control force signal;
said difference calculating means subtracts an output signal from said target control force calculating means;
said sign control means comprises first multiplying means for multiplying the signal produced by said second sensor means with an output signal from said difference calculating means and second multiplying means for multiplying the signal produced by said fourth sensor means with the output signal from said difference calculating means; and
said integrating means comprises first integrating means for integrating an output signal from said first multiplying means as a function of time, and second integrating means for integrating an output signal from said second multiplying means as a function of time.

8. An apparatus according to claim 7, wherein said suspension comprises a hydropneumatic spring, said second actuator means for variably controlling the spring constant of said hydropneumatic spring comprises a high-pressure gas supply source communicating with an accumulator as said hydropneumatic spring through a pipe so as to change a pressure of a gas chamber of said accumulator, and an auxiliary accumulator serving as a recovery source of a high-pressure gas from said high-pressure gas source, gas chambers of said accumulator and said auxiliary accumulator being adapted to communicate upon ON/OFF operation of an electromagnetic selector in response to an output signal from said integrating means.

9. An apparatus according to claim 6, wherein
said control means comprises means for generating a third output for discriminating a polarity or magnitude of the difference between the target control force and the sum of the spring and damping forces and for controlling a force which acts on said suspension and which is proportional to the difference, as needed;
said driving means comprises means for power-amplifying the third output; and
said actuator means comprises third actuator means for continuously and variably controlling external control force acting on the vibrating body in response to a signal obtained by power-amplifying the third output regardless of the suspension movement.

10. An apparatus according to claim 9, wherein said means for generating the third output comprises absolute value calculating means for calculating an absolute value of the output from said difference calculating means, means for comparing an output from said absolute value calculating means with a predetermined threshold value, and selecting means for determining in response to said comparing means whether the output from said difference calculating means is used as the third output.

11. An apparatus according to claim 4, wherein said target control force calculating means comprises: state discriminating means for discriminating a vibrating body mass, the spring constant, the damping coefficient, and a state of the external force or disturbance in response to outputs from said state detecting means; gain selecting means for selecting prestored optimal gains for various state signals used for vibration control on the basis of an output from said state discriminating means, the state signals being selected from the outputs from said state detecting means; and optimal target control force calculating means for multiplying the selected gains with the state signals used for vibration control and for adding products, an output from said optimal target control force calculating means being used to automatically set an optimal target control force in consideration of the external force or disturbance.

12. An apparatus according to claim 11, wherein said state discriminating means, said gain selecting means, and said target control coefficient calculating means in said control means comprise a microcomputer, said microcomputer comprising: input ports for receiving the outputs from said state detecting means; a first arithmetic unit for discriminating a state on the basis of the outputs from said state detecting means and for selecting optimal gains; a second arithmetic unit for calculating an optimal target control coefficient for the signals input to said input ports on the basis of the optimal gains selected by said first arithmetic unit; a memory for storing the optimal gains for said input ports and algorithms of said first and second arithmetic units; and output ports for outputting calculated results of said second arithmetic unit.

13. An apparatus according to claim 11, wherein said state discriminating means in said control means comprises a microcomputer, said microcomputer comprising: input ports for receiving outputs from said state detecting means; an arithmetic unit for discriminating a state on the basis of the outputs from said state detecting means and selecting optimal gains; a memory for storing the optimal gains and an algorithm of said arithmetic unit; and output ports for generating signals representing the optimal gains selected by said arithmetic unit.

14. An apparatus according to claim 13, wherein said optimal target control means comprises multiplying means for multiplying the outputs from said state detecting means with the signals representing the optimal gains output from said output ports in said microcomputer; and adding means for calculating a sum of outputs from said multiplying means.

* * * * *